US012532115B2

(12) United States Patent
Colich

(10) Patent No.: US 12,532,115 B2
(45) Date of Patent: Jan. 20, 2026

(54) ANTI-FEEDBACK AUDIO DEVICE WITH DIPOLE SPEAKER AND NEURAL NETWORK(S)

(71) Applicant: SONY INTERACTIVE ENTERTAINMENT INC., Tokyo (JP)

(72) Inventor: Dragoslav Colich, Orange, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 396 days.

(21) Appl. No.: 17/985,649

(22) Filed: Nov. 11, 2022

(65) Prior Publication Data

US 2023/0147707 A1 May 11, 2023

Related U.S. Application Data

(60) Provisional application No. 63/278,100, filed on Nov. 11, 2021.

(51) Int. Cl.
*H04R 7/04* (2006.01)
*H04R 5/027* (2006.01)
*H04R 5/04* (2006.01)
*H04R 7/26* (2006.01)

(52) U.S. Cl.
CPC ............... *H04R 7/04* (2013.01); *H04R 5/027* (2013.01); *H04R 5/04* (2013.01); *H04R 7/26* (2013.01)

(58) Field of Classification Search
None
See application file for complete search history.

(56) References Cited

U.S. PATENT DOCUMENTS 5,748,757 A * 5/1998 Kubli .................... H04R 1/406 381/361
5,960,391 A * 9/1999 Tateishi .............. G10L 21/0272 704/232
6,650,758 B1 * 11/2003 Van Schyndel .......... H04R 1/02 381/89
10,134,421 B1 * 11/2018 Sundaram ............... G10L 17/08
11,134,336 B2 9/2021 Pinkerton
11,595,751 B2 * 2/2023 Pinkerton .............. H04R 19/02
11,889,261 B2 * 1/2024 Liu ........................ H04R 3/005
2014/0151516 A1 * 6/2014 Liu ........................ H04R 1/026 248/124.1
2017/0061978 A1 * 3/2017 Wang .................. G10L 21/0232
2020/0372911 A1 * 11/2020 Seo ......................... G10L 17/00
(Continued)

*Primary Examiner* — Paul W Huber
(74) *Attorney, Agent, or Firm* — Kilpatrick Townsend & Stockton LLP

(57) ABSTRACT

Devices, methods, and systems are described for an anti-feedback audio device (100) comprising a dipole speaker (110) having an acoustically null sound plane (115) or acoustically null sound area (117), a first microphone (120) disposed substantially within the acoustically null sound plane (115) or acoustically null sound area (117), and a neural network (130) communicatively coupled to the dipole speaker and the first microphone (120) such that a first output from the first microphone is communicated to the neural network (130) for processing, and a second output from the neural network (130) is communicated to the dipole speaker (110). The combination of the dipole phase cancellation and the neural network gives an unexpected result of an extremely high signal-to-noise ratio for speech over noise.

36 Claims, 19 Drawing Sheets

(56) References Cited

U.S. PATENT DOCUMENTS

| | | | | |
|---|---|---|---|---|
| 2021/0125625 | A1 | 4/2021 | Huang et al. | |
| 2021/0250680 | A1* | 8/2021 | Pinkerton | H04R 1/222 |
| 2022/0223165 | A1* | 7/2022 | Kasilya Sudarsan | G10L 21/0208 |
| 2023/0109066 | A1* | 4/2023 | Shih | G10L 21/0264 381/94.1 |
| 2024/0203394 | A1* | 6/2024 | Trivedi | H03G 5/165 |

* cited by examiner

3D View from Front Upper Right

3D View from Front Lower Left

FIG. 4a
3.5” wide 400Hz
FIG. 4b
3.5” wide 1000Hz
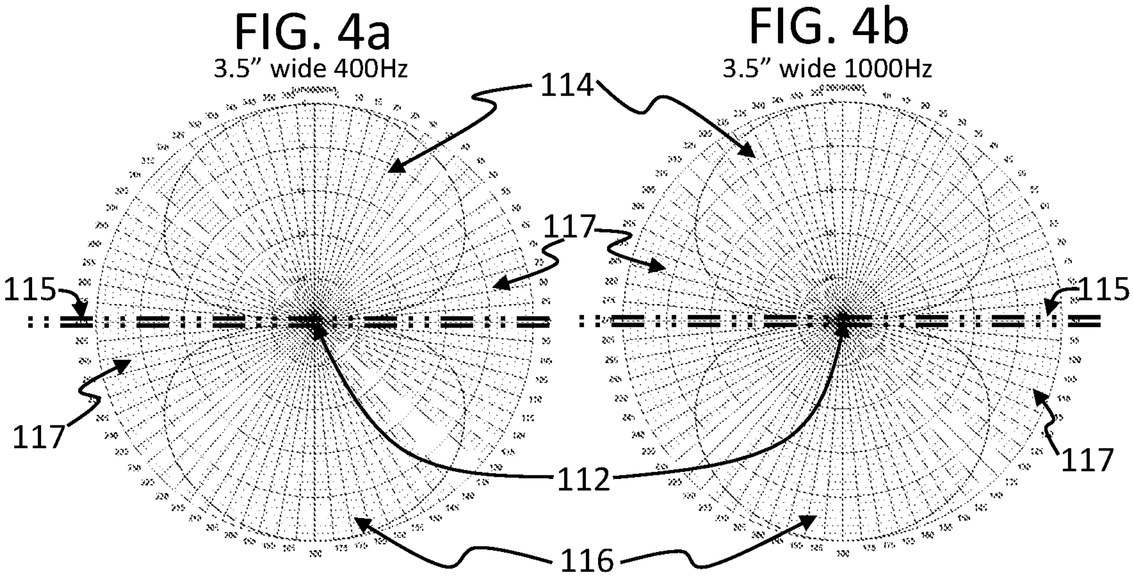
All Top Views
FIG. 4c
3.5” wide 5000Hz
FIG. 4d
3.5” wide 10000Hz
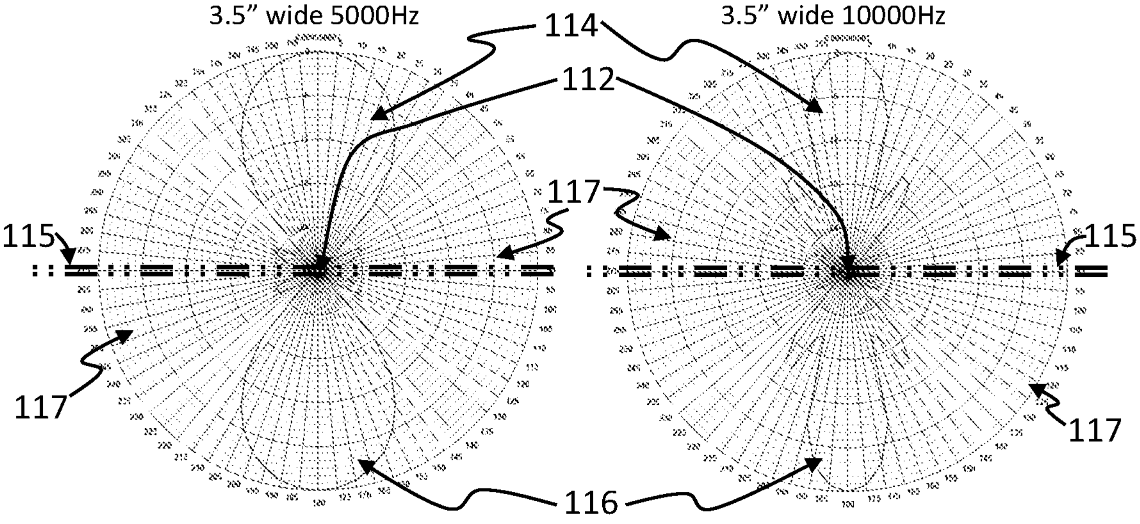
Polar Plots show ~-30dB of Noise Reduction from Dipole Speaker to Mic FIG. 5a
2” wide 400Hz
FIG. 5b
2” wide 1000Hz
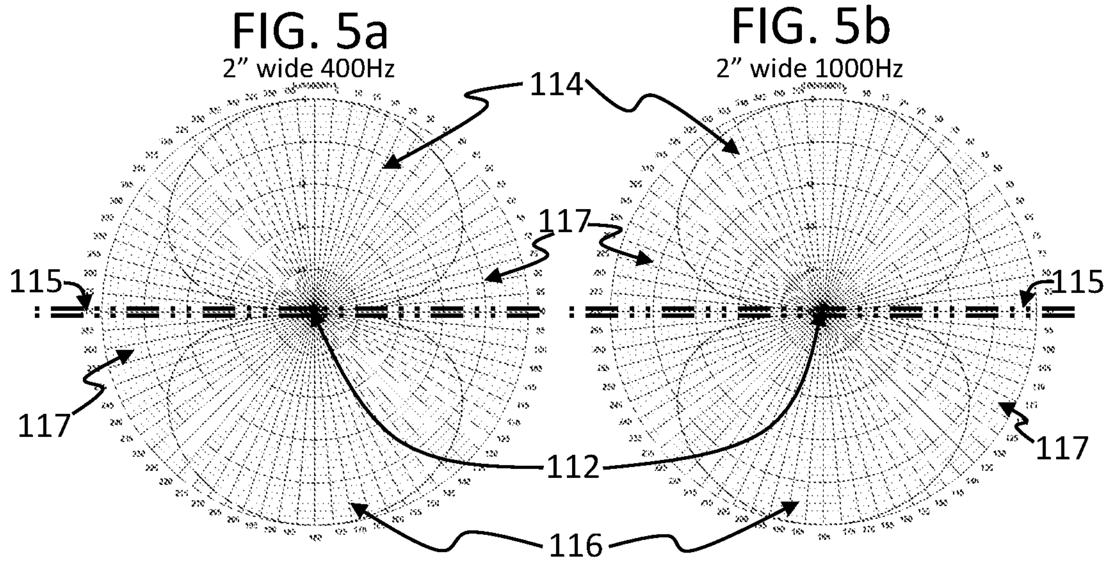
All Side Views
FIG. 5c
2” wide 5000Hz
FIG. 5d
2” wide 10000Hz
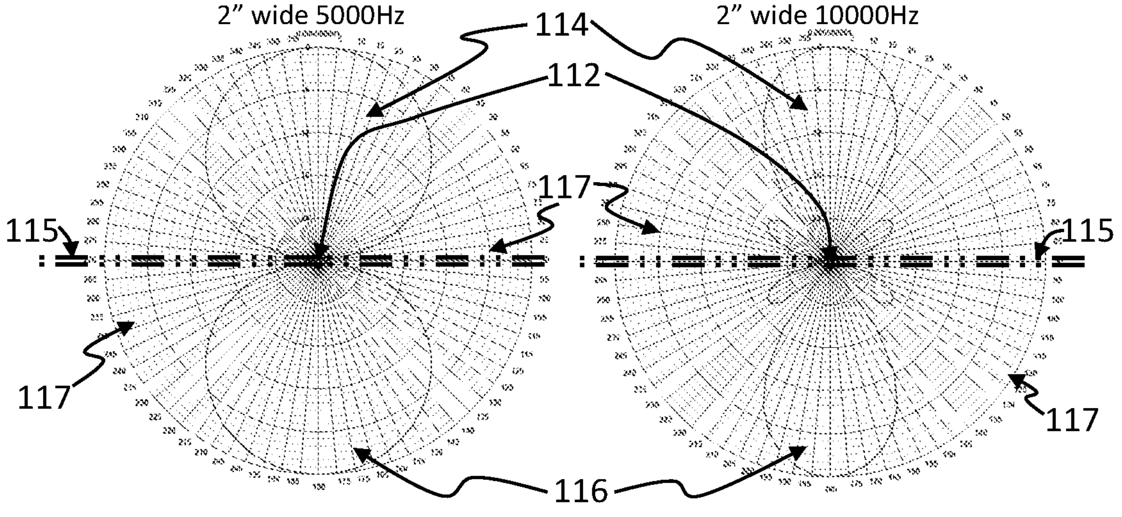
Polar Plots show ~-30dB of Noise Reduction from Dipole Speaker to Mic

FIG. 7a Top View

Front View

Side View

| Freq (Hz) | NN NR Off (dB) | NN NR ON (dB) | NN Noise Loss (dB) |
|---|---|---|---|
| 400 Hz | -96 dB | -104 dB | -8 dB |
| 1000 Hz | -93 dB | -111 dB | -18 dB |
| 5000 Hz | -96 dB | -111 dB | -15 dB |
| 10000 Hz | -120 dB | -120 dB | -0 dB |

Alternative Placement of Microphones 120,125 with Narrower Beam Pattern 121

Can use NN and/or phase manipulation to control beamforming

Speech and Noise are amplified, Feedback occurs.
0dB + Gain = Feedback and/or Echo Anti-Feedback & Echo Cancellation (EC) for Speech is -30dB.
Anti-Feedback & EC for Non-Speech is -15dB -30dB = -45dB.

Anti-Feedback & Echo Cancellation (EC) for Speech is -30dB -30dB = -60dB.
Anti-Feedback & EC for Non-Speech is -15dB -30dB -30dB = -75dB!

ANTI-FEEDBACK AUDIO DEVICE WITH DIPOLE SPEAKER AND NEURAL NETWORK(S)

CROSS-REFERENCE TO RELATED APPLICATIONS

This application claims priority benefit to U.S. Provisional Patent Ser. No. 63/278,100, filed Nov. 11, 2021, entitled "ANTI-FEEDBACK TRANSCEIVER WITH NEURAL NETWORK(S)".

BACKGROUND

Anti-feedback audio devices, including audio or acoustic transceivers and/or teleconferencing devices, include an audio emitter, emanator, or transmitter such as a speaker and an audio receiver such as a microphone with various techniques to minimize or prevent sounds from speakers from feeding back into microphone or other source inputs. In addition to preventing feedback in a single location, anti-feedback techniques are also needed when multiple devices with speakers and microphones are connected to each other across, for example, a network.

Dipole speakers or transducers emit sound waves to the front and rear. These front and rear sound waves are substantially out of phase. Thus, dipole speakers create a null zone, acoustically null sound plane, acoustically null sound area, acoustic cancellation zone, and/or acoustic cancellation area where the acoustic waves from the front of the dipole speaker meet and cancel or quasi-cancel the acoustic waves from the rear of the dipole speaker. Dipole speakers may be a single speaker or multiple speakers coupled together to create a front and back wave that can cancel each other in the acoustically null sound plane and/or acoustically null sound area. Some non-limiting examples of dipole speakers include one or more dynamic speakers, cone and dome speakers, piezoelectric speakers, planar speakers, planar magnetic speakers, and electrostatic speakers.

Planar magnetic transducers or speakers comprise a flat, lightweight diaphragm with conductive circuits suspended in a magnetic field. When energized with a voltage or current in the magnetic field, the conductive circuit creates forces that are transferred to the planar diaphragm which produces sound. These planar diaphragms tend to emanate planar wavefronts across a wide range of frequencies. Opening the front and back areas of a planar magnetic speaker enables a dipole speaker.

Neural networks, also known as artificial neural networks (ANNs) or simulated neural networks (SNNs), are a subset of artificial intelligence (AI) and/or machine learning (ML) and are at the heart of deep learning algorithms or deep neural networks (DNNs), including convolutional neural networks (CNNs), recurrent neural networks (RNNs), and other types of neural networks such as Perceptrons, Feed Forwards, Radial Basis Networks, Long/Short Term Memory (LSTM), Gated Recurrent Units, Auto Encoders (AE), Variational AE, Denoising AE, Sparse AE, Markov Chains, Hopfield Networks, Boltzmann Machines, Restricted BM, Deep Belief Networks, Deep Convolutional Networks, Deconvolutional Networks, Deep Convolutional Inverse Graphics Networks, Generative Adversarial Networks, Liquid State Machines, Extreme Learning Machines, Echo State Networks, Deep Residual Networks, Kohonen Networks, Support Vector Machines, and/or Neural Turing Machines. Their names and structures are inspired by the human brain, mimicking the way that biological neurons signal to one another. Neural networks can be trained to detect, pass, or reject certain patterns including acoustic patterns for purposes of filtering out sounds, compressing or decompressing sounds, passing certain sounds, rejecting certain sounds, and/or controlling certain sounds such as noise, disturbances, dogs barking, babies crying, musical instruments, keyboard clicks, lightning and thunder noises, and/or other non-speech interference, including combining, filtering, alleviating, reducing, or eliminating sounds. These neural networks can be trained for use in beamforming, focusing on certain sounds or sources, cancelling or suppressing certain sounds, equalizing sounds, and controlling volume levels of certain sounds.

Problems arise in single communications devices and multiple connected communications devices such as audio or acoustic transceivers, conferencing speakers, teleconferencing units, and speakers and microphones configured in ways that may cause or result in feed-back, including environments where certain sounds, characteristics of sounds, feedback of sounds, noise, distracting sounds, and other types of interfering sounds need to be controlled, modified, enhanced, rejected, and/or suppressed.

SUMMARY

The present disclosure relates to anti-feedback audio devices, systems, and methods including acoustic transceivers and/or teleconferencing devices, systems, and methods comprising at least one dipole speaker (110) having a diaphragm (112), the diaphragm configured to form an acoustically null sound area (117), also referred to as a null zone, acoustically null area, acoustic cancellation zone, and/or acoustic cancellation area, which may also include an acoustically null sound plane (115); a first microphone (120) disposed substantially in, on, within, or around the acoustically null sound area (117) or acoustically null sound plane (115); and one or more neural networks (130) communicatively coupled to the first microphone (120) and at least one dipole speaker (110) such that a first output (122), signal, or output signal from the first microphone is communicated to the one or more neural networks (130), and a second output (132), signal, and/or output signal from the one or more neural networks (130) is communicated to the at least one dipole speaker (110). The anti-feedback audio devices, systems, and methods are further configured to use as a conferencing system and or a teleconferencing unit.

In an unexpected result, the combination of the dipole phase cancellation and the neural network(s) results in an unexpected extremely high speech-to-noise ratio for anti-feedback, speech-to-noise, and for echo cancellation of approximately 75 dB or higher!

It is desirable to design acoustic transceivers and teleconferencing units to have extremely high acoustic fidelity from the dipole speaker(s) while reducing acoustic feedback with the placement of microphones in acoustically null or phase-cancelled locations.

It is also desirable to train and use artificial intelligence neural networks (AINNs), deep neural networks (DNNs), convolutional neural networks (CNNs), recurrent neural networks (RNNs), and/or other AI and neural network systems to reduce feedback, background noise, aural clutter, aural distractions, disturbances, interference, and/or other noise from acoustic transceivers and/or teleconferencing devices and systems. It is further desirable to train and use artificial intelligence neural networks (AINNs), deep neural networks (DNNs), convolutional neural networks (CNNs), recurrent neural networks (RNNs), and/or other AI and neural network systems to further improve background noise, aural clutter, aural distractions, disturbances, interference, and/or other noise in acoustic transceivers and/or teleconferencing devices and systems even better than can be done with classical acoustic phase cancellation or phase shifting, classical noise reduction, classical echo cancellation, and/or classical beamforming. Examples of these neural networks (130) include but are not limited to one or more of a deep neural network, convolutional neural network (CNN), recurrent neural network (RNN), Perceptron, Feed Forward, Radial Basis Network, Long/Short Term Memory (LSTM), Gated Recurrent Units (GRU), Auto Encoders (AE), Variational AE, Denoising AE, Sparse AE, Markov Chain, Hopfield Network, Boltzmann Machine, Restricted BM, Deep Belief Network, Deep Convolutional Network, Deconvolutional Network, Deep Convolutional Inverse Graphics Network, Generative Adversarial Network, Liquid State Machine, Extreme Learning Machine, Echo State Network, Deep Residual Network, Kohonen Network, Support Vector Machine, and Neural Turing Machine.

One novel solution is for an anti-feedback audio device (100) to comprise at least one dipole speaker (110) having a diaphragm (112), the diaphragm configured to form an acoustically null sound plane (115), a null zone, acoustically null sound plane, acoustically null sound area (117), acoustic cancellation zone, or acoustic cancellation area; a first microphone (120) disposed substantially on, in, within, or around the acoustically null sound plane (115) or acoustically null sound area (117); and combine that with one or more neural networks (130) communicatively coupled to the first microphone (120) and the at least one dipole speaker (110) such that a first output (122) from the first microphone is communicated to the one or more neural networks (130), and a second output (132) from the one or more neural networks (130) is communicated to the at least one dipole speaker (110).

In one aspect, the anti-feedback audio device (100) is designed so that the acoustically null sound plane (115) or acoustically null sound area (117) is in, on, within, and/or around an area wherein a first acoustic signal (114) from the front of the at least one dipole speaker (110) is phase cancelled by an out-of-phase acoustic signal (116) from the rear of the at least one dipole speaker (110).

In another aspect, the anti-feedback audio device (100) is designed so that at least one dipole speaker (110) is a dipole speaker, a dynamic speaker, a dome and cone speaker, a planar speaker, a planar magnetic speaker, a piezoelectric speaker, or an electrostatic speaker.

In another aspect, the anti-feedback audio device (100) includes at least one dipole speaker (110) including a supporting structure (113) such that the at least one dipole speaker (110) is configurable to stand upright from 0 degrees to at least 90 degrees or even 150 degrees from a horizontal plane. In another aspect, the support structure lays flat with the dipole speaker in one direction, then is gradually raised to 90 degrees, then is laid flat for a full 180-degree rotation.

In an aspect, it is preferred to use a dipole speaker, which may be one or more dipole speakers. The dipole speaker angle should be adjusted to be on-axis with the listener at ear level. In a typical application on a desk and computer, this angle is between 20-75 degrees, but a support bar can fold the dipole speaker to be anywhere from 0 to 180 degrees or even 0 to 360 degrees.

In an aspect, the second output (132) of the one or more neural networks (130) is communicated through a controller-driver (111) to the at least one dipole speaker (110). This controller-driver may include amplifiers, volume controls, codecs, power switches, and other various control features to control the signal to the dipole speaker and system.

In an aspect, the first microphone (120) is an omnidirectional microphone. In other aspects, the first microphone (120) is a cardioid mic, a directional mic, a figure-of-8 mic, or any other useful microphone beam pattern.

In other aspects, multiple microphones are used and spread throughout the null plane. More microphones allow better pick up pattern control and have higher sensitivity to allow longer range of pickup, for example with multiple people in a multi-person conference room. In aspects, beam forming may be used which requires a minimum of two microphones.

In one aspect, the one or more neural networks (130) are one or more deep neural networks. In other aspects, the one or more neural networks (130) are one or more convolutional neural networks or recurrent neural networks. In other aspects, the neural network is at least one of a deep neural network, convolutional neural network (CNN), recurrent neural network (RNN), Perceptron, Feed Forward, Radial Basis Network, Long/Short Term Memory (LSTM), Gated Recurrent Units (GRU), Auto Encoders (AE), Variational AE, Denoising AE, Sparse AE, Markov Chain, Hopfield Network, Boltzmann Machine, Restricted BM, Deep Belief Network, Deep Convolutional Network, Deconvolutional Network, Deep Convolutional Inverse Graphics Network, Generative Adversarial Network, Liquid State Machine, Extreme Learning Machine, Echo State Network, Deep Residual Network, Kohonen Network, Support Vector Machine, or Neural Turing Machine In one aspect, the one or more neural networks (130) executes on one or more digital signal processors (DSPs). In other aspects, the one or more neural networks (130) executes on one or more graphics processing units (GPU) or a separate semiconductor device or other alternative device.

In one aspect, the one or more neural networks (130) are trained to reduce background noise from the first output of the first microphone to the output of the one or more neural networks (130). In another aspect, the one or more neural networks (130) are trained to reduce feedback in the acoustically null sound plane (115) and/or the acoustically null sound area (117) such that the acoustic null is improved even further with the neural network than is possible with just the classical acoustic null phase cancellation. In another aspect, the one or more neural networks (130) are trained to pass human voices [speech] and reduce or eliminate non-speech from the first output of the first microphone to the output of the one or more neural networks (130). This combination of acoustic nulls and neural networks provides a nonobvious unexpected result with an improvement that is 75 dB or more of speech-to-noise ratio! Other patents and literature do not disclose or contemplate alone or in combination this extraordinary speech to noise level.

In another aspect, the anti-feedback audio device (100) further comprises a second microphone (125) disposed substantially within the acoustically null sound plane (115) and/or the acoustically null sound area (117), the second microphone (125) communicatively coupled to one or more neural networks (130). In this aspect, the one or more neural networks (130) are trained to implement a receiving beam pattern (121) from beamforming of the first microphone (120) and the second microphone (125) such that a higher sensitivity is received from sound sources (122, 123, 124) within the beam pattern (121) and a higher rejection is achieved of sound sources (126, 127, 128, 129) outside of the beam pattern (121) than can be achieved from traditional or classical phase-shift beamforming. In another aspect, the first microphone (120) and the second microphone (125) are reconfigurable in an alternate pattern so that the beam pattern (121) is much narrower and rejects even more of the noise and aural distraction outside of the beam pattern (121) than is achievable with standard, traditional, or classical phase-shift beamforming. These combinations of classical phase-shift beamforming with approximately 6 dB of improvement in reducing background residual noise, when combined with neural networks and dipole speakers achieving unexpected results of 75 dB results in 75 dB plus ~6 dB for improved beamforming resulting in a nonobvious unexpected result of about 81 dB of anti-feedback and echo cancellation of speech over background noise and interference! Other patents and literature do not disclose or contemplate alone or in combination this extraordinary speech to noise level.

In another aspect, the anti-feedback audio device (100) further comprises the one or more neural networks (130) communicatively connected to a communications network (160). This may be an external network or an internal network, a wireless, landline or optical network. In this aspect, signals arriving from the communications network (160) are processed by the one or more neural networks (130) and sent to the dipole speaker (110), and signals departing from the microphones (120, 125) are processed by the one or more neural networks (130) and transmitted to the communications network (160).

In an aspect, the anti-feedback audio device (100) acts as a teleconferencing device or system.

In one aspect, the anti-feedback audio device (100) comprises one or more neural networks (130) that are trained to execute enhancement techniques of acoustic echo cancellation (AEC). In other aspects, the one or more neural networks (130) are trained to execute enhancement techniques of acoustic echo suppression (AES), dynamic range compression (DRC), automatic gain control (AGC), noise suppression, noise cancellation, equalization (EQ), and other acoustic activities that are provided by neural networks.

The anti-feedback audio device, method, and system also comprises methods for minimizing feedback and other aural noises in a teleconference system comprising the steps of configuring at least one dipole speaker (110) having a diaphragm (112), to form an acoustically null sound plane (115) or acoustically null sound area (117); disposing within the acoustically null sound plane (115) or acoustically null sound area (117) a first microphone (120); and communicatively coupling one or more neural networks (130) between the first microphone (120) and the at least one dipole speaker (110) such that a first output (122) from the first microphone is communicated to the one or more neural networks (130), and a second output (132) from the one or more neural networks (130) is communicated to the at least one dipole speaker (110).

The methods include an acoustically null sound plane (115) centralized in the acoustically null sound area (117) in an area wherein a first acoustic signal (114) from the front of the at least one dipole speaker (110) is phase cancelled by an out-of-phase acoustic signal (116) from the rear of the at least one dipole speaker (110).

The methods include an acoustically null sound plane (115) positioned within the acoustically null sound area (117) in an area whereby a first acoustic signal (114) from the front of the at least one dipole speaker (110) is phase cancelled by an out-of-phase acoustic signal (116) from the rear of the at least one dipole speaker (110).

In aspects, the methods include at least one dipole speaker (110) being a dipole speaker, a planar speaker, a planar magnetic speaker, a piezoelectric speaker, an electrostatic speaker, a dynamic speaker, and a cone and dome speaker.

The methods also incorporate wherein at least one dipole speaker (110) includes a supporting structure (113) such that the at least one dipole speaker (110) is configurable to stand upright from 0 degrees to at least 90 degrees from a horizontal plane. One aspect includes the supporting structure being able to rotate 180 degrees or 360 degrees.

Aspects of these novel methods include where the second output (132) of the one or more neural networks (130) is communicated through a controller-driver (111) to the at least one dipole speaker (110).

In aspects, the methods include wherein the first microphone (120) is an omnidirectional microphone, a cardioid microphone, a directional mic, a bidirectional mic, or any other microphone directional configuration.

Aspects include wherein the one or more neural networks (130) is one or more deep neural networks, or one or more convolutional neural networks.

Aspects include wherein the one or more neural networks (130) execute on one or more digital signal processors (DSPs) and/or on one or more graphics processing units (GPU) or other semiconductor or other neural network device.

Aspects include methods wherein the one or more neural networks (130) are trained to reduce background noise from the first output of the first microphone to the output of the one or more neural networks (130), including being trained to pass human voices [speech] from the first output of the first microphone to the output of the one or more neural networks (130). In another aspect, the one or more methods of training neural networks (130) reduce feedback in the acoustically null sound plane (115) and/or the acoustically null sound area (117) such that the acoustic null is improved even further with the neural network than is possible with just the classical acoustic null phase cancellation. This combination of acoustic nulls from dipole speakers and neural networks provides an anti-feedback and echo cancellation for speech-to-noise of approximately 75 dB, which is a nonobvious unexpected result! Other patents and literature do not disclose or contemplate alone or in combination this extraordinary speech to noise level.

Method aspects further comprise a second microphone (125) disposed substantially within the acoustically null sound plane (115) the second microphone (125) communicatively coupled to one or more neural networks (130).

These method aspects include wherein the one or more neural networks (130) are trained to implement a receiving beam pattern (121) from beamforming of the first microphone (120) and the second microphone (125) such that a higher sensitivity is received from sound sources (122, 123, 124) within the beam pattern (121) and a higher rejection is achieved of sound sources (126,127,128,129) outside of the beam pattern (121) than is achievable from classical or traditional phase-shifted beamforming. Other aspects include reconfiguring the microphones into different locations or alternative placements to narrow or widen the beam pattern (121) more than is achievable with standard, traditional, or classical phase-shift beamforming. These combinations of classical phase-shift beamforming with approximately 6 dB of improvement in reducing background residual noise, when combined with neural networks and dipole speakers achieving unexpected results of 75 dB results in 75 dB plus ~6 dB from improved beamforming resulting in a nonobvious unexpected result of about 81 dB of anti-feedback and echo cancellation of speech over background noise and interference! Other patents and literature do not disclose or contemplate alone or in combination this extraordinary speech to noise level.

In method aspects, the one or more neural networks (130) are communicatively connected to a communications network (160). The networks are communication networks, such as wireless networks, wired networks, Bluetooth networks, optical networks, telephonic networks, and/or Internet or local networks.

Method aspects include where signals coming from the communications network (160) are processed by the one or more neural networks (130) and sent to the dipole speaker (110), and/or signals coming from the microphones (120, 125) are processed by the one or more neural networks (130) and transmitted to the communications network (160).

Method aspects include wherein the audio device is a teleconferencing device or system.

Methods include wherein the one or more neural networks (130) are trained to execute enhancement techniques of acoustic echo cancellation (AEC), acoustic echo suppression (AES), dynamic range compression (DRC), automatic gain control (AGC), and/or equalization (EQ).

The anti-feedback audio device, method, and system also includes an anti-feedback system comprising at least one anti-feedback audio device (100) connected over a network (160) wherein the anti-feedback audio device comprises at least one dipole speaker (110) having an acoustically null sound area (117), at least one microphone disposed in the acoustically null sound area, and at least one neural network (130) disposed in the anti-feedback audio devices such that anti-feedback, noise suppression, and echo cancellation exceed 60 dB, 75 dB, or even higher.

This nonobvious unexpected result of the anti-feedback audio device and system achieving speech-to-noise figures of 75 dB, or even higher is an extremely remarkable signal-to-noise ratio for speech over noise, non-speech, feedback, and echoes. Other patents and literature do not disclose or contemplate alone or in combination this extraordinary speech to noise level.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

BRIEF DESCRIPTION OF THE DRAWINGS

Preferred embodiments and other aspects are illustrated by way of example, and not by way of limitation. In the figures of the accompanying drawings like reference numerals refer to similar elements. In other embodiments and aspects multiple descriptive names are given to the same reference number elements.

FIGS. 4*a*-4*d* show polar plots of the top view of a dipole speaker and diaphragm (112) showing the phase cancellation with a diaphragm that is 3.5 inches wide.

FIGS. 5*a*-5*d* show polar plots of the side view of a dipole speaker and diaphragm (112) showing the phase cancellation with a diaphragm that is 2 inches high.

FIGS. 7*a*, 7*b*, and 7*c* show the top view, front view, and side view respectively of anti-feedback audio device (100) which shows the acoustically null sound area (117) around the dipole speaker (110) from a top view and side view showing that the acoustically null sound area (117) extends upward and outward along the top and sides of the dipole speaker (110).

FIG. 13*a* shows a graph of different acoustic frequencies from the low end of the speech range to the very high end of harmonics from speech with noise reduction off and noise reduction on.

FIG. 13*b* is a table that shows the average noise reduction from the graph in FIG. 13*a*, at the four frequencies that are shown in the polar plots in FIGS. 4*a*-4*d* and FIGS. 5*a*-5*d*.

FIG. 17*a* is improved with neural networks.

FIG. 17*b* is improved with the dipole speaker.

Figure 1:
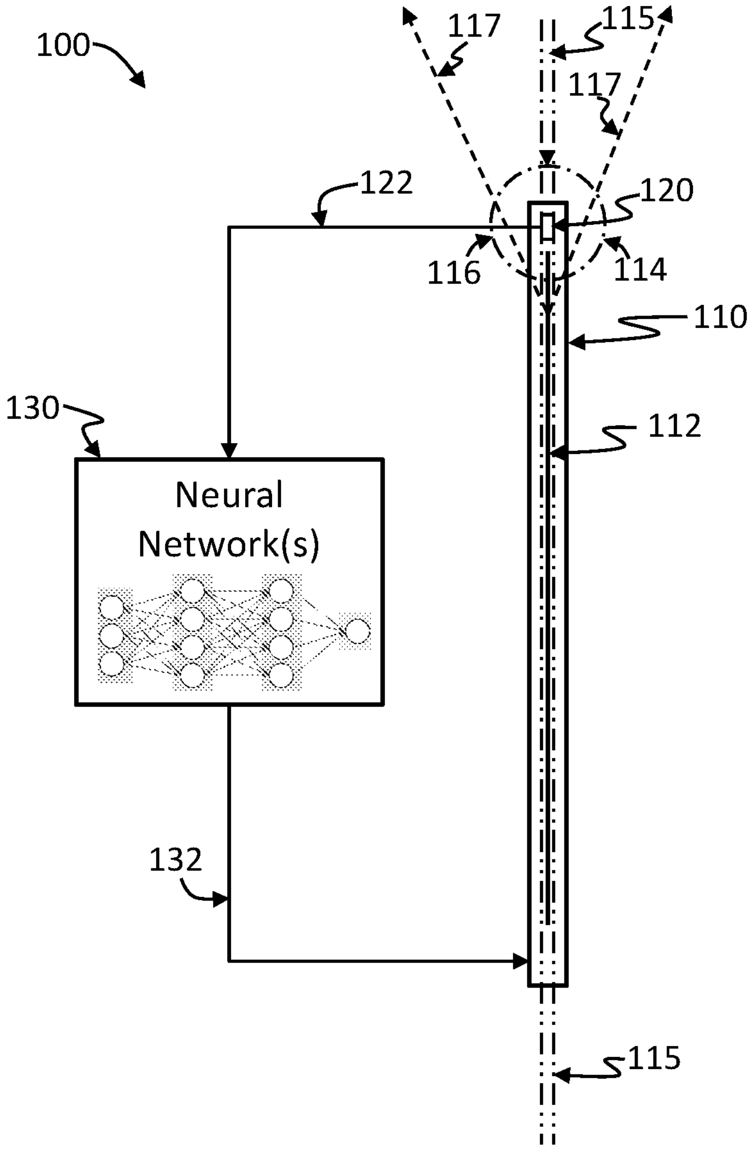
FIG. 1 is a diagram of an anti-feedback audio device with a dipole speaker (110) with a diaphragm (112), the diaphragm configured to form an acoustically null sound area (117), including an acoustically null sound plane (115), a first microphone (120) disposed substantially within, on, or in the acoustically null sound area (117) or the acoustically null sound plane (115), and one or more neural networks (130) communicatively coupled to the first microphone (120) and the at least one dipole speaker (110) such that a first output (122) from the first microphone is communicated to the one or more neural networks (130), and a second output (132) from the one or more neural networks (130) is communicated to the at least one dipole speaker (110).

The present disclosure is susceptible to modifications and alternative forms, with representative embodiments shown by way of example in the drawings and described in detail below. Inventive aspects of this disclosure are not limited to the disclosed embodiments. Rather, the present disclosure is intended to cover alternatives falling within the scope of the disclosure as defined by the appended claims.

DETAILED DESCRIPTION

Embodiments of the present disclosure are described herein. It is to be understood, however, that the disclosed embodiments are merely examples, and that other embodiments can take various and alternative forms. The figures are not necessarily to scale. Some features may be exaggerated or minimized to show details of components. Therefore, specific structural and functional details disclosed herein are not to be interpreted as limiting, but merely as a representative basis for teaching one skilled in the art to variously employ the present disclosure.

Certain terminology may be used in the following description for the purpose of reference only, and thus are not intended to be limiting. For example, terms such as “above”, “below”, “top view”, and “end view”, refer to directions in the drawings to which reference is made. Terms such as “front,” “back,” “fore,” “aft,” “left,” “right,” “rear,” and “side” describe the orientation and/or location of portions of the components or elements within a consistent but arbitrary frame of reference, which is made clear by reference to the text and the associated drawings describing the components or elements under discussion. Moreover, terms such as “first,” “second,” “third,” and so on may be used to describe separate components. Such terminology may include the words specifically mentioned above, derivatives thereof, and words of similar import.

Problems arise in teleconferencing because of acoustic feedback, as well as noisy and aurally distracting environments. In some cases, it is difficult to hear the other communicating party because of background noise such as dogs barking, babies crying, sirens, or other distractions and interferences. In some cases, output from a speaker may feed back into an open microphone which causes acoustic feedback and/or echoes.

One inventive solution is devices, methods, and systems for an anti-feedback audio device (100) without feedback and audible distractions and noise, comprising at least one dipole speaker (110) having an acoustically null sound plane (115) and/or an acoustically null sound area (117), a first microphone (120) disposed substantially within the acoustically null sound plane (115) or acoustically null sound area (117), and a neural network (130) communicatively coupled to the at least one dipole speaker and the first microphone (120) such that first output from the first microphone is communicated to the neural network (130) for processing, and second output from the neural network (130) is communicated to the at least one dipole speaker (110).

Referring to the drawings, FIG. 1 is a diagram of a dipole speaker (110) with a diaphragm (112), the diaphragm configured to form an acoustically null sound plane (115) and/or an acoustically null sound area (117), a first microphone (120) disposed substantially on the acoustically null sound plane (115) and/or within the acoustically null sound area (117), and one or more neural networks (130) communicatively coupled to the first microphone (120) and the at least one dipole speaker (110) such that a first output (122) from the first microphone is communicated to the one or more neural networks (130), and a second output (132) from the one or more neural networks (130) is communicated to the at least one dipole speaker (110). The neural network(s) (130) shown may also be connected to or include other functional devices or capabilities, such as connections to external networks, amplifiers, equalizers, Bluetooth devices, noise cancellation systems, and other electronic devices and functionalities.

FIG. 1 further shows the anti-feedback audio device (100) wherein the acoustically null sound plane (115) and/or the acoustically null sound area (117) are configured such that a first acoustic signal (114) from the front of the at least one dipole speaker (110) is phase cancelled by an out-of-phase acoustic signal (116) from the rear of the at least one dipole speaker (110). Note that the phase cancellation occurs in more than merely the null sound plane (115) itself. In practice, the acoustically null sound plane (115), a null zone, or null sound plane, is at the center of an acoustically null sound area (117), acoustic cancellation zone, or acoustic cancellation area shown by the dotted lines wherein a first acoustic signal (114) from the front of the at least one dipole speaker (110) is phase cancelled in the acoustically null sound area (117) by an out-of-phase acoustic signal (116) from the rear of the at least one dipole speaker (110). The acoustically null sound plane (115) is generally planar to the diaphragm (112) and/or in the same plane as the diaphragm (112) as shown. However, in practice, other objects or surfaces, such as the tabletop, objects close to the dipole speaker, etc., may affect the position and shape of the acoustically null sound plane (115) and/or the acoustically null sound area (117) so that they vary somewhat from the drawings as shown. Note that the acoustic cancellation varies depending upon the frequency response of the signal emanating from the dipole speaker and the characteristics and training of the neural network (130).

From a side or top perspective, this acoustically null sound area (117) appears as a V-shape or cone around the entire speaker. This means that microphones can be placed in multiple locations in, around, and on the dipole speaker within the acoustically null sound area (117) with extremely low feedback. Any directionality of microphone may be used in the acoustically null sound area (117) including omnidirectional microphones, cardioid microphones, dipole (figure of 8) microphones, and/or any other directionality of microphone. Any type of microphone may also be used, including condenser mics, dynamic mics, electret mics, MEMS (micro-electromechanical system) mics, dynamic mics, and/or any other type of microphone. Note that the shape of the cone or V-shape varies with the frequency and the distance from the dipole speaker. In FIG. 1, the planar dipole speaker (112) is shown, which creates a planar sound wave further increasing the anti-feedback characteristics of the acoustically null sound area (117). A preferred aspect of the anti-feedback audio device, method, and system is a planar magnetic speaker (110) which further enhances the linearity and acoustic fidelity of the dipole speaker. Note that the acoustically null sound area (117) for dipole speakers is an area that does not exist in omnidirectional speakers or in the bulging cardioid figures for most directional speakers (not shown).

Figure 2A:
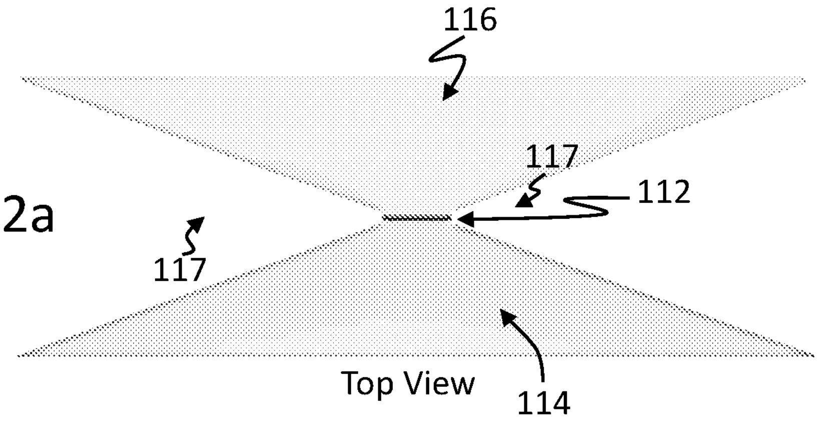
FIGS. 2*a* and 2*b* are diagrams of the anti-feedback audio device (100) further showing the acoustically null sound plane (115) and acoustically null sound area (117), wherein a first acoustic signal (114) from the front of the at least one dipole speaker (110) is phase cancelled by an out-of-phase acoustic signal (116) from the rear of the at least one dipole speaker (110).
Figure 2B:
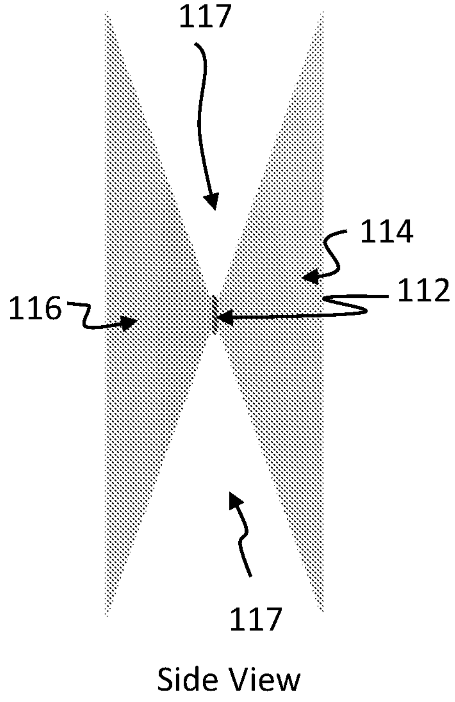

FIG. 2*a* shows a top view and FIG. 2*b* shows a side view of the acoustically null sound area (117) around diaphragm (112) wherein microphones may be placed with anti-feedback resulting effects. The previously described first acoustic signal (114) from the front of the dipole diaphragm (112) and the out-of-phase rear signal (116) of the dipole diaphragm (112) are where the two wavefronts meet in the acoustically null sound area (117) and cause phase cancellation.

Figure 3A:
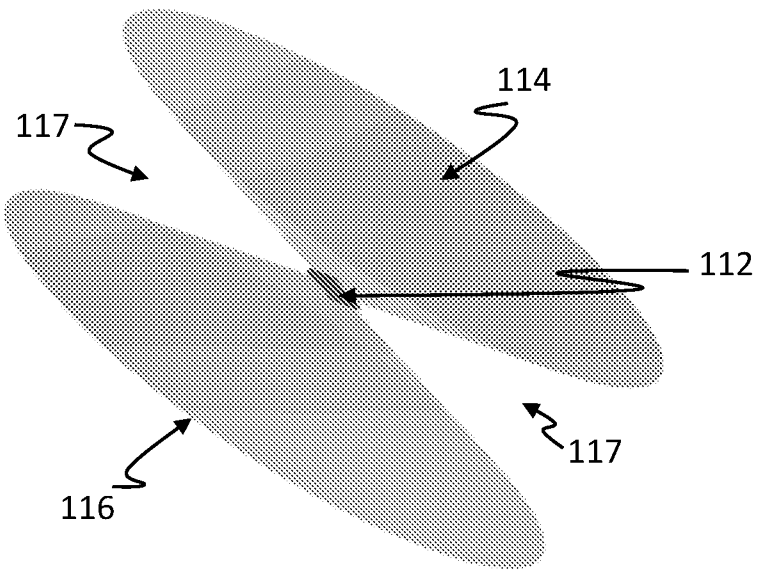
FIGS. 3*a* and 3*b* are diagrams of the anti-feedback audio device (100) further showing the acoustically null sound area (117) around the dipole speaker (110) in three dimensions (3D).
Figure 3B:
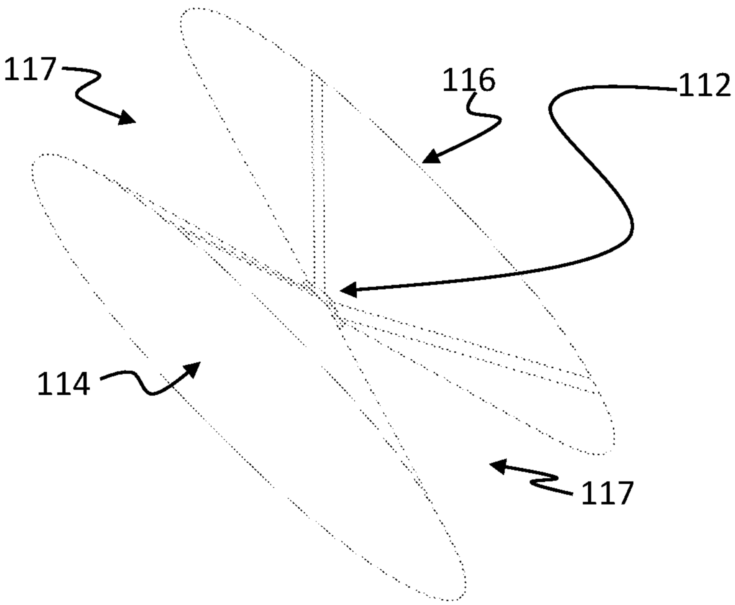

FIG. 3*a* and FIG. 3*b* show three-dimensional (3D) views from the upper right and lower left of the acoustically null sound area (117) around the diaphragm (112) of the dipole speaker (110) wherein microphones may be placed with anti-feedback results due to phase cancellation of the signals from the first acoustic signal (114) from the front of the dipole diaphragm (112) and the out-of-phase rear signal (116) of the dipole diaphragm (112).

FIG. 4*a*, FIG. 4*b*, FIG. 4*c*, and FIG. 4*d* are polar plots of the decibel levels of the signals from a top view of a 3.5" wide dipole diaphragm (112) at different frequencies (400 Hz., 1000 Hz., 5000 Hz., and 10000 Hz.). FIG. 4*a* shows the 3.5" wide diaphragm's decibel level at 400 Hz, toward the low end of the speech range. FIG. 4*b* shows the 3.5" wide diaphragm's decibel level at 1000 Hz, toward the middle of the speech range. FIG. 4*c* shows the 3.5" wide diaphragm's decibel level at 5000 Hz, toward the top of the speech range. FIG. 4*d* shows the 3.5" wide diaphragm's decibel level at 10000 Hz, with just high harmonics of the speech range. Note that FIGS. 4*a*-4*d* show the diaphragm (112) at the center of the polar chart along with the first acoustic signal (114) from the front area of the dipole speaker and the out-of-phase rear signal (116) from the rear of the dipole speaker, both of which show high decibel levels of relative 0 dB. Because the front and rear are out-of-phase, phase cancellation occurs where the front and rear waves meet, which is shown by the acoustically null sound plane (115) which goes left to right from 270 degrees to 90 degrees on the polar chart. Maximum phase cancellation occurs along this acoustically null sound plane (115) which indicates phase cancellation of −30 dB. However, various degrees of phase cancellation also occur in the acoustically null sound area (117), which surrounds the acoustically null sound plane (115). Therefore, depending upon the audio frequency, various amounts of phase cancellation occur. This means that microphones may be placed in the acoustically null sound area (117) and still achieve some phase cancellation. Note that the lower frequencies tend to wrap around, and phase cancel while the higher frequencies tend to be directional with less phase cancellation. Note that the polar plots show about −30 dB of phase cancellation or −30 dB at the null on the sides of the diaphragm (112).

FIG. 5*a*, FIG. 5*b*, FIG. 5*c*, and FIG. 5*d* are polar plots of the decibel levels of the signals from a side view which is a 2" high dipole diaphragm (112) at different frequencies (400 Hz., 1000 Hz., 5000 Hz., and 10000 Hz.). FIG. 5*a* shows the 2" high diaphragm's decibel level at 400 Hz, toward the low end of the speech range. FIG. 5*b* shows the 2" high diaphragm's decibel level at 1000 Hz, toward the middle of the speech range. FIG. 5*c* shows the 2" high diaphragm's decibel level at 5000 Hz, toward the top of the speech range. FIG. 5*d* shows the 2" high diaphragm's decibel level at 10000 Hz, with just high harmonics of the speech range. Note that FIGS. 5*a*-5*d* show the diaphragm (112) at the center of the polar chart along with the first acoustic signal (114) from the front area of the dipole speaker and the out-of-phase signal (116) from the rear area of the dipole speaker, both of which show high decibel levels with a relative 0 dB. Because the front and rear are out-of-phase, phase cancellation occurs where the front and rear waves meet, which is shown by the acoustically null sound plane (115) which goes left to right from 270 degrees to 90 degrees on the polar chart. Maximum phase cancellation occurs along this acoustically null sound plane (115) which is −30 dB or more. However, various degrees of phase cancellation also occur in the acoustically null sound area (117), which surrounds the acoustically null sound plane (115). Therefore, depending upon the frequency, various amounts of phase cancellation occur. This means that microphones may be placed in the acoustically null sound area (117) and still achieve some phase cancellation. Note that the lower frequencies tend to wrap around, and phase cancel while the higher frequencies tend to be directional with less phase cancellation. Note that the polar plots show about −30 dB of phase cancellation or −30 dB at the null on the sides of the diaphragm (112).

Figure 6:
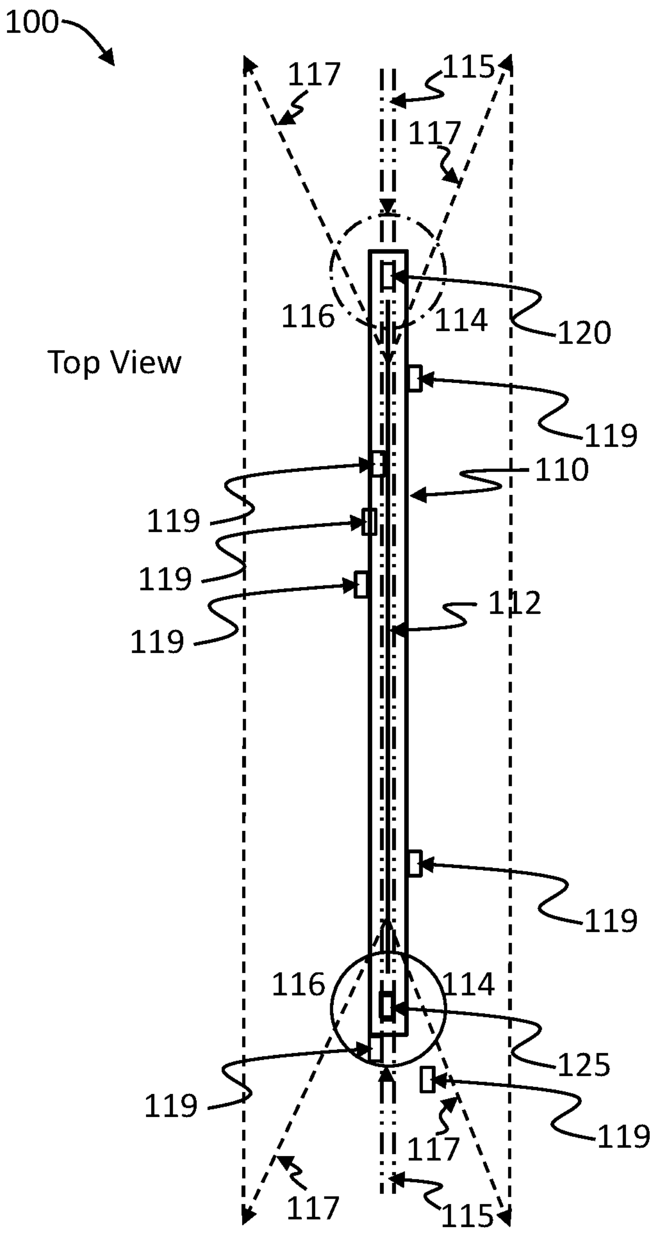
FIG. 6 is a diagram of the top view of an anti-feedback audio device (100) with multiple microphones in acoustically null sound areas (117) and acoustically null sound plane (115).

FIG. 6 is a diagram of an anti-feedback audio device (100) which shows the acoustically null sound area (117) around the dipole speaker (110) from a top view which shows that the acoustically null sound area (117) extends upward and outward along the top and sides of the dipole speaker (110). This means that additional microphones such as microphone (125) may also be placed in additional locations in the acoustically null sound plane (115) which is within the acoustically null sound area (117). However, it also means that other microphones (119) may also be placed outside of the acoustically null sound plane (115) yet still within the acoustically null sound area (117) and have anti-feedback resulting effects. FIG. 6 shows multiple instances of other microphones (119) placed on the front, back, and sides of the dipole speaker that are high enough, low enough, or placed widely enough to have anti-feedback results from phase cancellations within the acoustically null sound area (117).

Figure 7C:
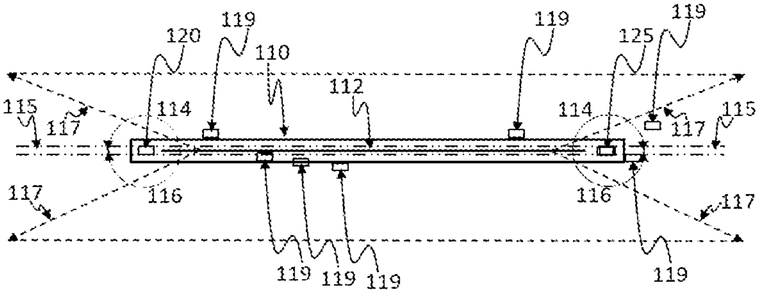
Figure 7C:
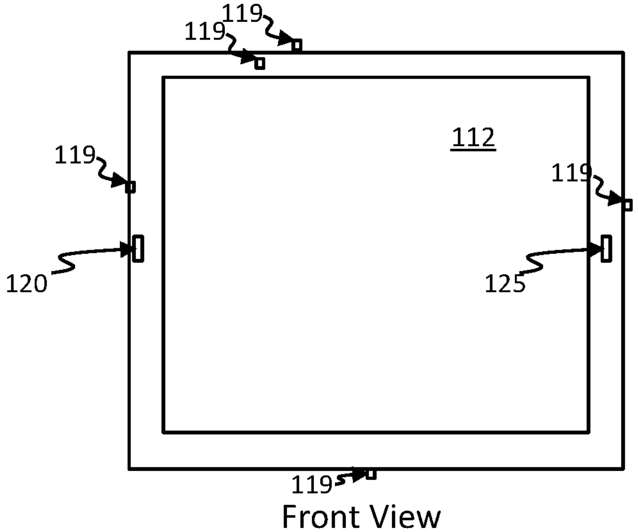
Figure 7B:
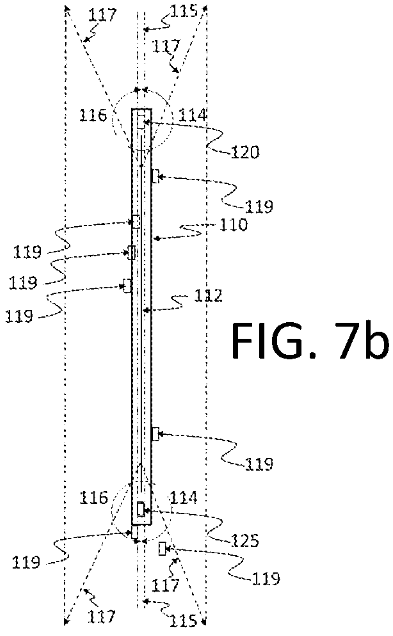

FIGS. 7*a*, 7*b*, and 7*c* show the top view, side view, and front view respectively of the anti-feedback audio device (100) with diaphragm (112). These show the acoustically null sound areas (117) around the dipole speaker (110) from a top view (FIG. 7*a*) and side view (FIG. 7B) showing that the acoustically null sound area (117) extends upward and outward along the top and sides of the dipole speaker (110). This means that in addition to microphones (120, 125) which are in the acoustically null sound plane (115), additional microphones (119) may also be placed in additional locations outside of the acoustically null sound plane (115) yet still within the acoustically null sound area (117) and have anti-feedback resulting effects. FIGS. 7*a*, 7*b*, and 7*c* show multiple instances of other microphones (119) placed on the front, back, and sides of the dipole speaker that are high enough, low enough, or placed widely enough to have anti-feedback results from phase cancellations within the acoustically null sound area (117).

Figure 8:
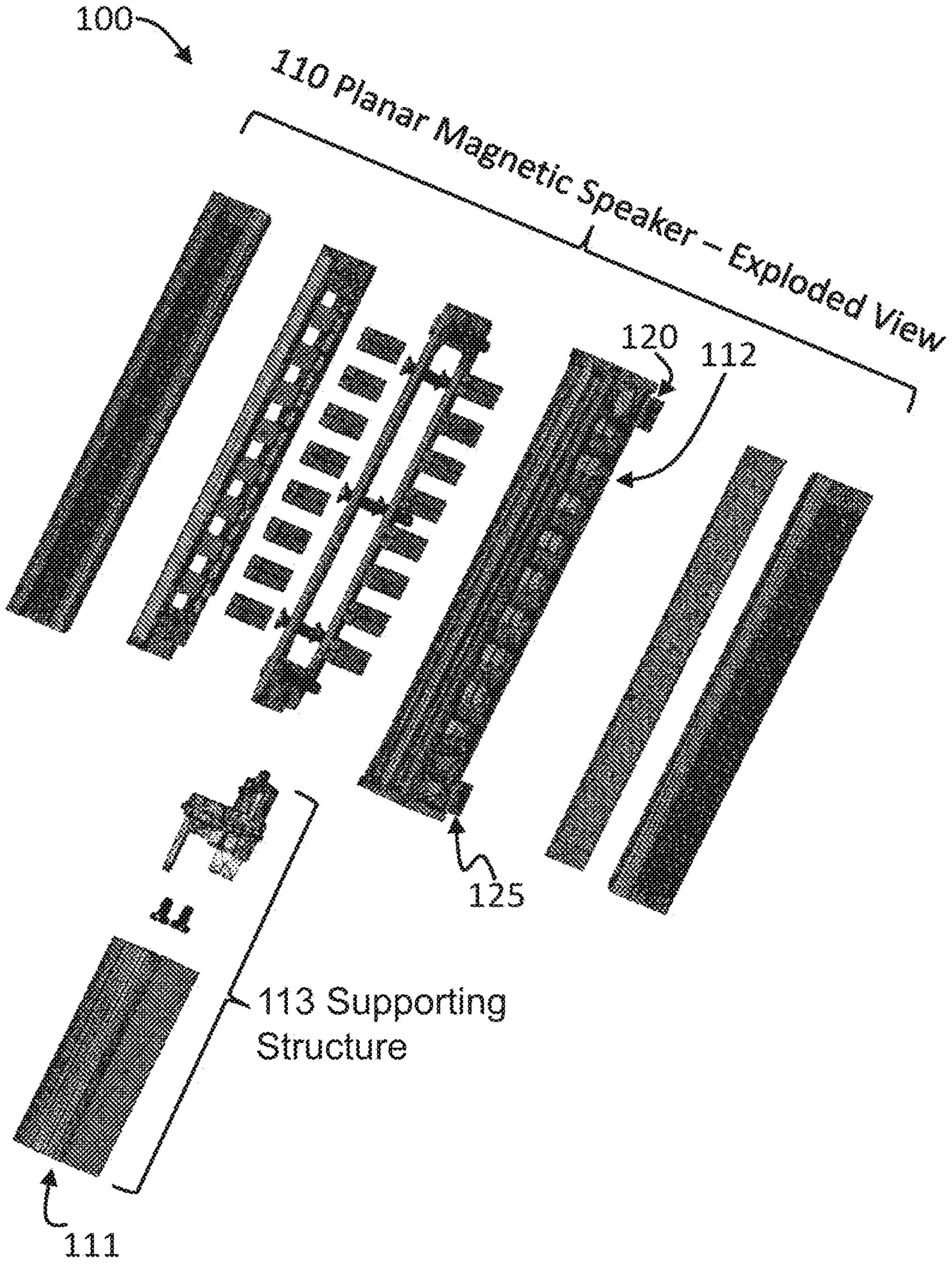
FIG. 8 is an exploded view of a planar magnetic speaker (110) with microphones (120, 125) exploded at the edges of dipole speaker (110).
Figure 9:
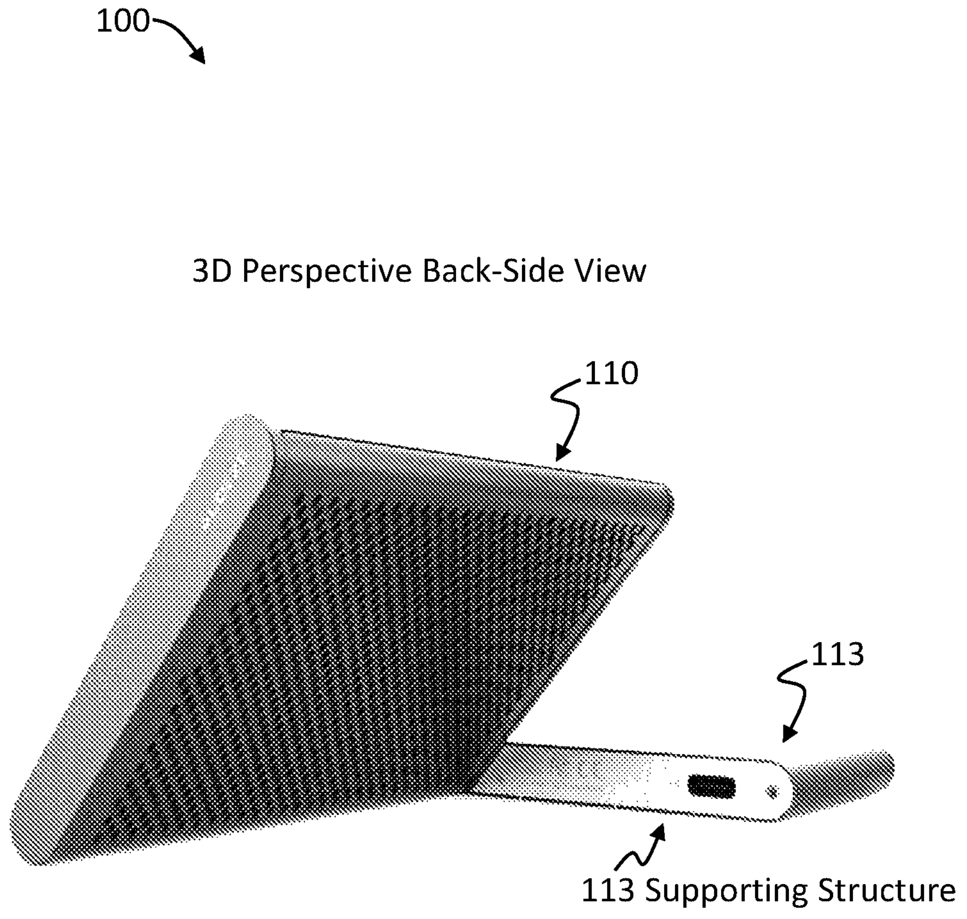
FIG. 9 is a 3D perspective illustration of the anti-feedback audio device (100) as viewed from the back-side view of the dipole speaker (110) with the supporting structure (113) holding the dipole speaker (110) upright at approximately 45 degrees.
Figure 10:
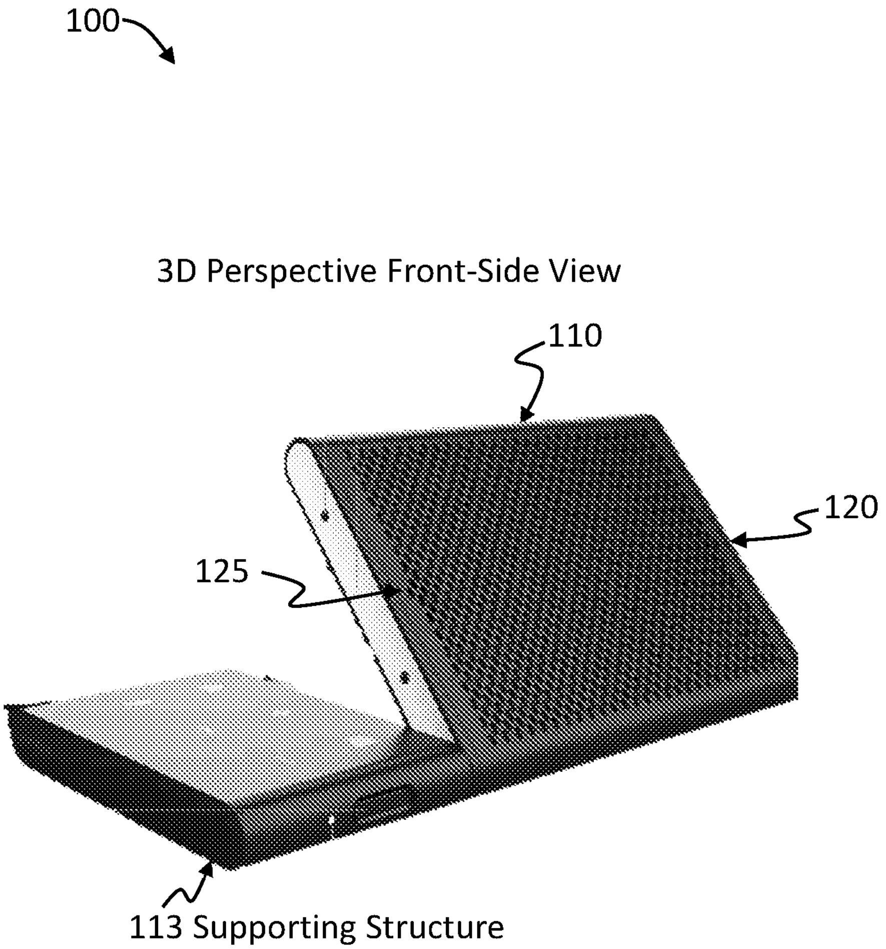
FIG. 10 is a 3D perspective illustration of the anti-feedback audio device (100) as viewed from the front-side view of the dipole speaker (110) with the supporting structure (113) holding the dipole speaker (110) upright at approximately 45 degrees.

FIG. 8 is an exploded view of a planar magnetic speaker (110) with microphones (120, 125) exploded at the edges of dipole speaker (110) and diaphragm (112). FIG. 8 shows an exploded view of supporting structure (113) for holding the dipole speaker (110) at an angle as shown in FIG. 9 and FIG. 10. FIG. 8 also shows aspects where controller-driver (111) and other supporting electronics are housed within the supporting structure (113).

FIG. 9 is a 3D perspective illustration of the anti-feedback audio device (100) as viewed from the back-side view of the dipole speaker (110) with the supporting structure (113) holding the dipole speaker (110) upright at approximately 45 degrees. Note that the supporting structure can angle the dipole speaker (110) from lying flat at 0 degrees upright to 90 degrees, and then down flat at 180 degrees. In this example, typically the user would be on the other side of the dipole speaker (110) facing outward and towards us from behind the dipole speaker on the left.

FIG. 10 is a 3D perspective illustration of the anti-feedback audio device (100) as viewed from the front-side view of the dipole speaker (110) with the supporting structure (113) holding the dipole speaker (110) upright at approximately 45 degrees. Note that the supporting structure can angle the dipole speaker (110) from lying flat at 0 degrees upright to 90 degrees, and then down flat at 180 degrees. In this example, typically the user would be on this side of the dipole speaker (110) on the right, facing toward the dipole speaker and away from the viewer.

Figure 11:
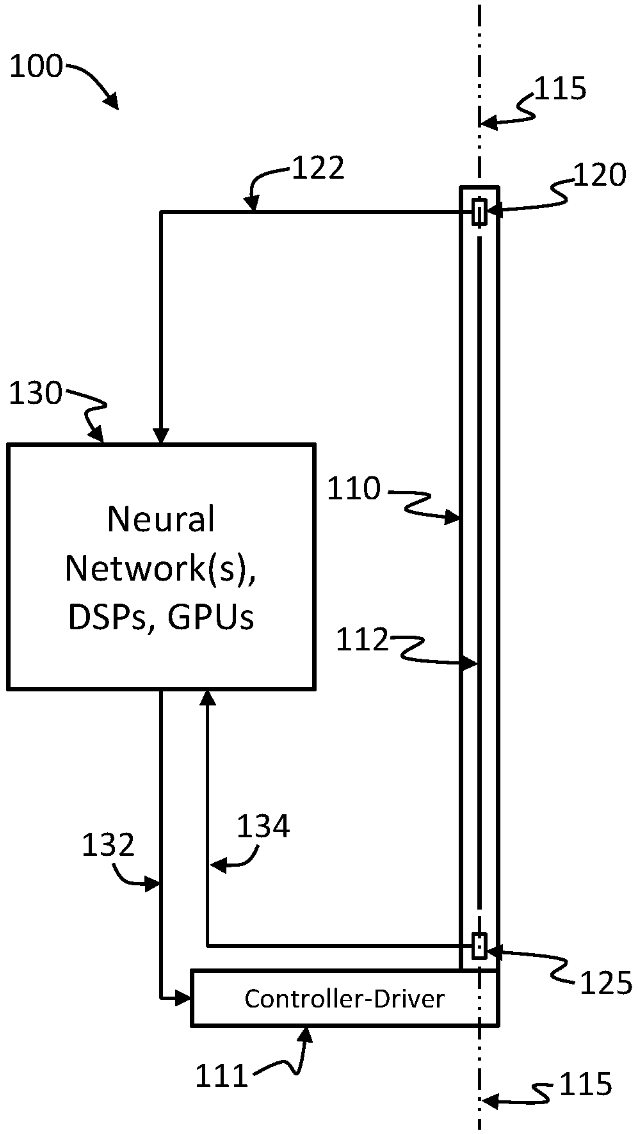
FIG. 11 is a block diagram or illustration of the anti-feedback audio device (100) wherein the second output (132) of the one or more neural networks (130) is communicated through a controller-driver (111) to the at least one dipole speaker (110).

FIG. 11 is a diagram or illustration of the anti-feedback audio device (100) wherein the second output (132) of the one or more neural networks (130) is communicated through a controller-driver (111) to the at least one dipole speaker (110). Typically, the controller-driver (111) and other electronics including the neural networks (130), digital signal processors (DSPs), and graphic processor units (GPUs) are housed in the supporting structure (113), but these electronics may be kept in the dipole speaker housing or externally to the anti-feedback audio device (100). FIG. 11 also shows a second microphone (125) which is also fed into the neural network (130) and/or other electronics such as noise cancellers, equalizers, amplifiers, DSPs, GPUs, and/or other electronic systems. In this drawing, microphones (120, 125) are disposed in the acoustically null sound plane (115). However, other microphones may be disposed outside of the acoustically null sound plane (115), yet still be disposed within the acoustically null sound area (117) and have anti-feedback resulting effects.

Figure 12A:
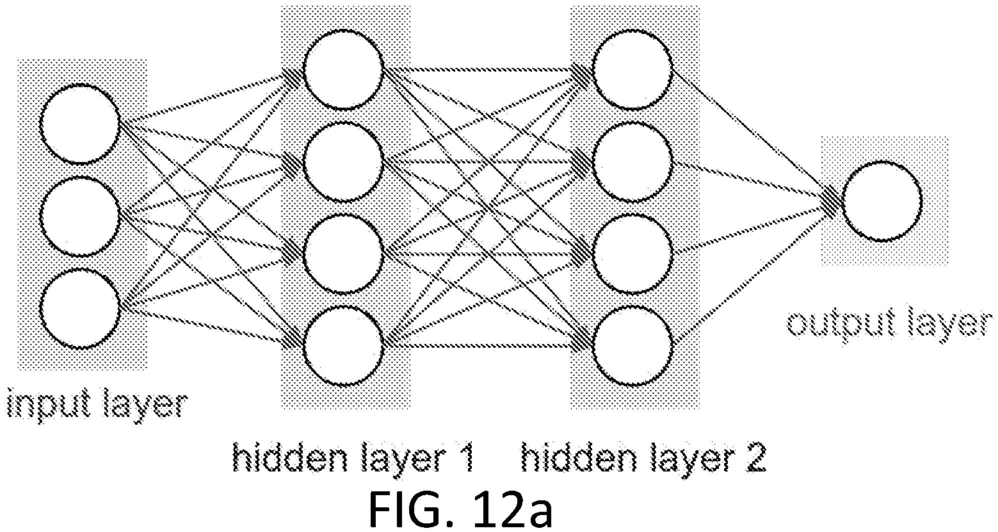
FIG. 12*a* and FIG. 12*b* show various aspects of different approaches to neural networks which may be used to train and implement various neural network acoustic treatments.
Figure 12B:
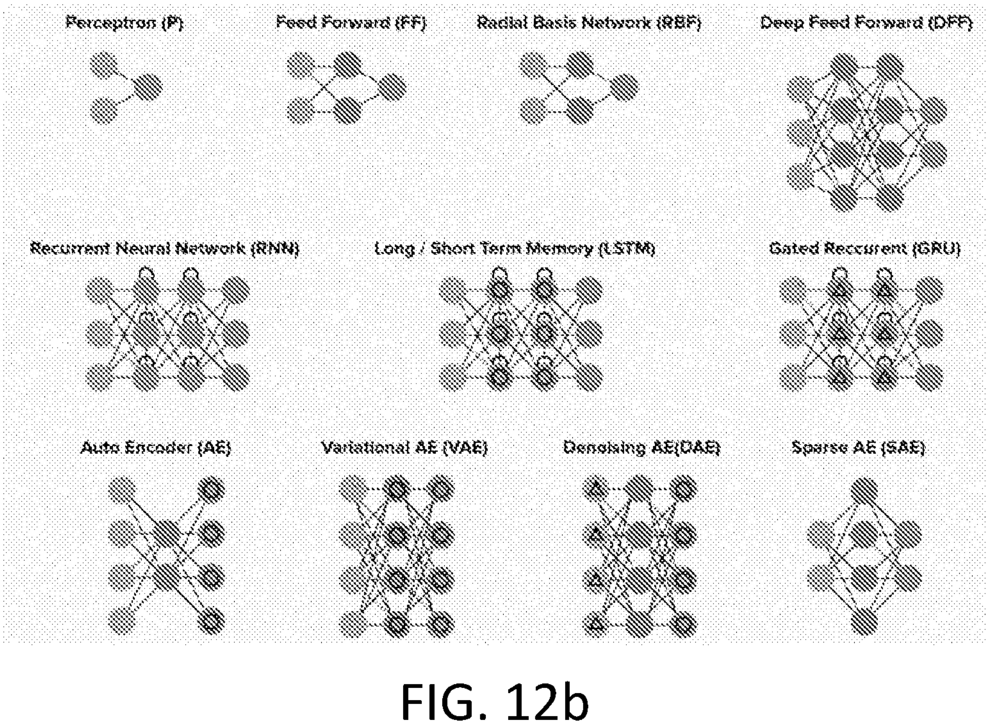

FIG. 12*a* and FIG. 12*b* show various aspects of different approaches to neural networks which may be used to train and implement various AI acoustic treatments such as reducing or eliminating noise, disturbances, dogs barking, babies crying, sirens, interferences, and other non-speech sounds, and passing through human speech. These neural networks generally comprise input layers, hidden layers, and output layers. Examples of these neural networks include, but are not limited to, deep neural networks (DNNs), convolutional neural networks (CNN), recurrent neural networks (RNN), Perceptrons, Feed Forwards, Radial Basis Networks, Long/Short Term Memory (LSTM), Gated Recurrent Units (GRU), Auto Encoders (AE), Variational AE, Denoising AE, Sparse AE, Markov Chain, Hopfield Network, Boltzmann Machine, Restricted BM, Deep Belief Network, Deep Convolutional Network, Deconvolutional Network, Deep Convolutional Inverse Graphics Network, Generative Adversarial Network, Liquid State Machine, Extreme Learning Machine, Echo State Network, Deep Residual Network, Kohonen Network, Support Vector Machine, and/or Neural Turing Machines.

Figures 13A, 13B:
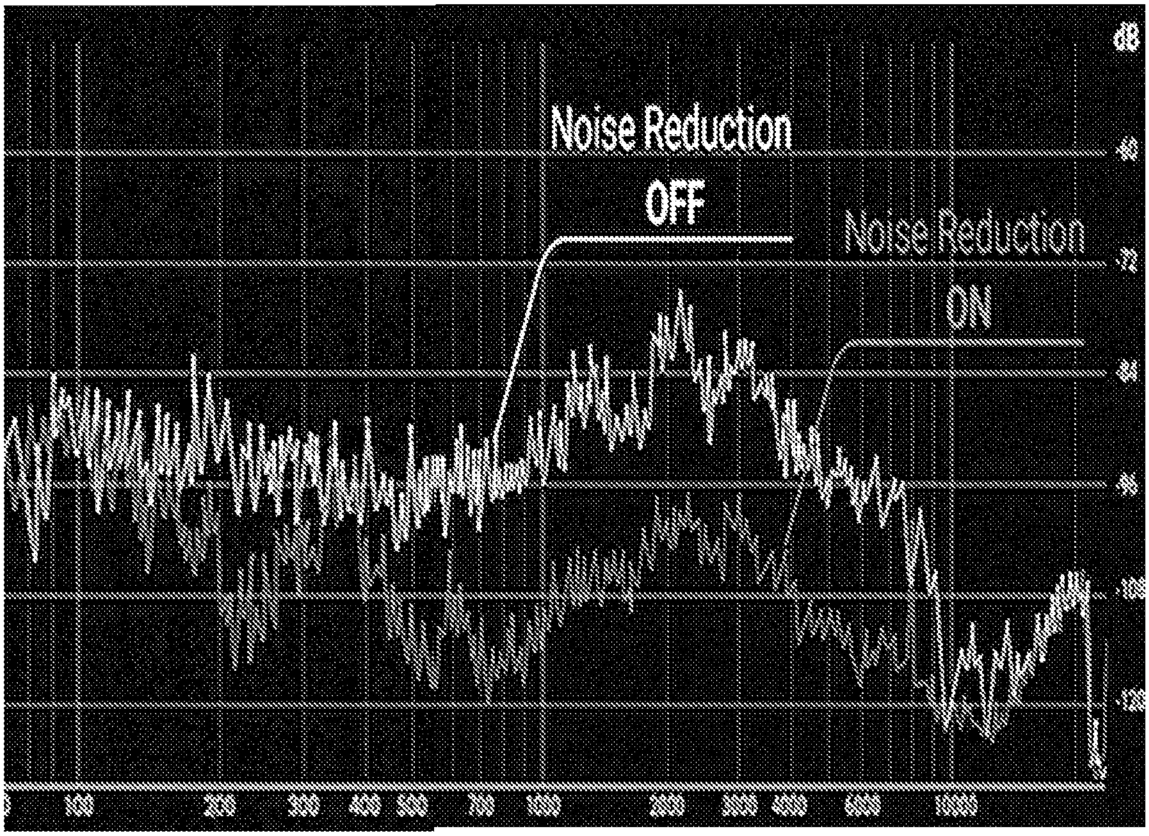

FIG. 13*a* shows a graph of different acoustic frequencies from the low end of the speech range to the very high end of harmonics from speech. In this chart the upper graph shows exemplary noise reduction from the neural network. The top line in the chart shows speech and noise that passes through with the neural network noise reduction turned off. The bottom line shows the speech that passes through without the noise, when the neural network noise reduction is turned on.

FIG. 13*b* is a table that shows the average noise reduction from the graph in FIG. 13*a*, at the four frequencies that are shown in the polar plots in FIGS. 4*a*-4*d* and FIGS. 5*a*-5*d*. In the table in FIG. 13*b*, on the leftmost column are the frequencies of 400 Hz., 1000 Hz., 5000 Hz., and 10000 Hz. The average decibel level at 400 Hz. with the noise reduction off is approximately −96 dB, whereas with the noise reduction on it is approximately −104 dB, showing an improvement of approximately −8 dB with neural network noise reduction at the low end of the speech range. The average decibel level at 1000 Hz. with the noise reduction off is approximately −93 dB, whereas with the noise reduction on it is approximately −111 dB, showing an improvement of approximately −18 dB with neural network noise reduction at the middle of the speech range. The average decibel level at 5000 Hz. with the noise reduction off is approximately −96 dB, whereas with the noise reduction on it is approximately −111 dB, showing an improvement of approximately −15 dB with neural network noise reduction at the high end of the speech range. The average decibel level at 10000 Hz. with the noise reduction off is approximately −120 dB, whereas with the noise reduction on it is approximately also −120 dB, showing no improvement of approximately −0 dB with neural network noise reduction where the highest harmonics exist in the speech range. This means that overall, using neural networks, the noise in the relevant speech range is reduced by approximately −15 to −18 dB! As we will see, when we couple this with the gains from dipole speaker phase cancellation, we get unexpectedly high results from the combination of neural networks and dipole speaker phase cancellation.

Figure 14:
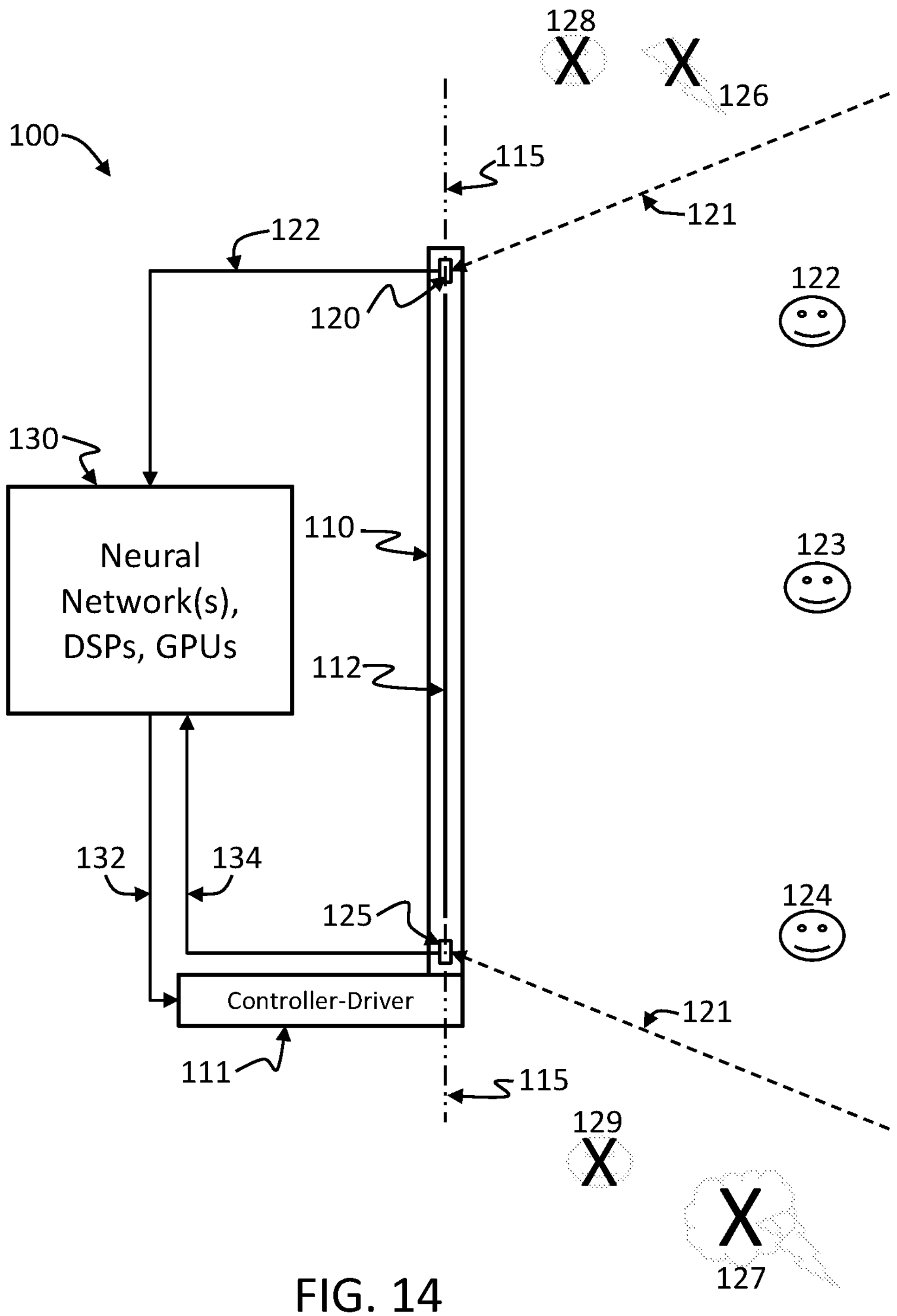
FIG. 14 is a diagram or illustration of the anti-feedback audio device (100) further comprising a second microphone (125) disposed substantially within the acoustically null sound plane (115) with the second microphone (125) communicatively coupled to one or more neural networks (130) such that beamforming is improved over traditional or classical phase-shift beamforming by the one or more neural networks (130).

FIG. 14 is a diagram or illustration of the anti-feedback audio device (100) further comprising a second microphone (125) disposed within the acoustically null sound plane (115) with the second microphone (125) communicatively coupled (134) to one or more neural networks (130). Here, the one or more neural networks (130) are trained to implement a receiving beam pattern (121) from acoustic beamforming or artificial intelligent neural network beamforming of the first microphone (120) and the second microphone (125) such that a higher sensitivity is received from sound sources (122, 123, 124) within the beam pattern (121) and a higher rejection is achieved of sound sources (126, 127, 128, 129) outside of the beam pattern (121). Here, sound sources (126, 127, 128, 129) are covered with an X to indicate that those sound sources are rejected, noise cancelled, and/or decreased.

Figure 15:
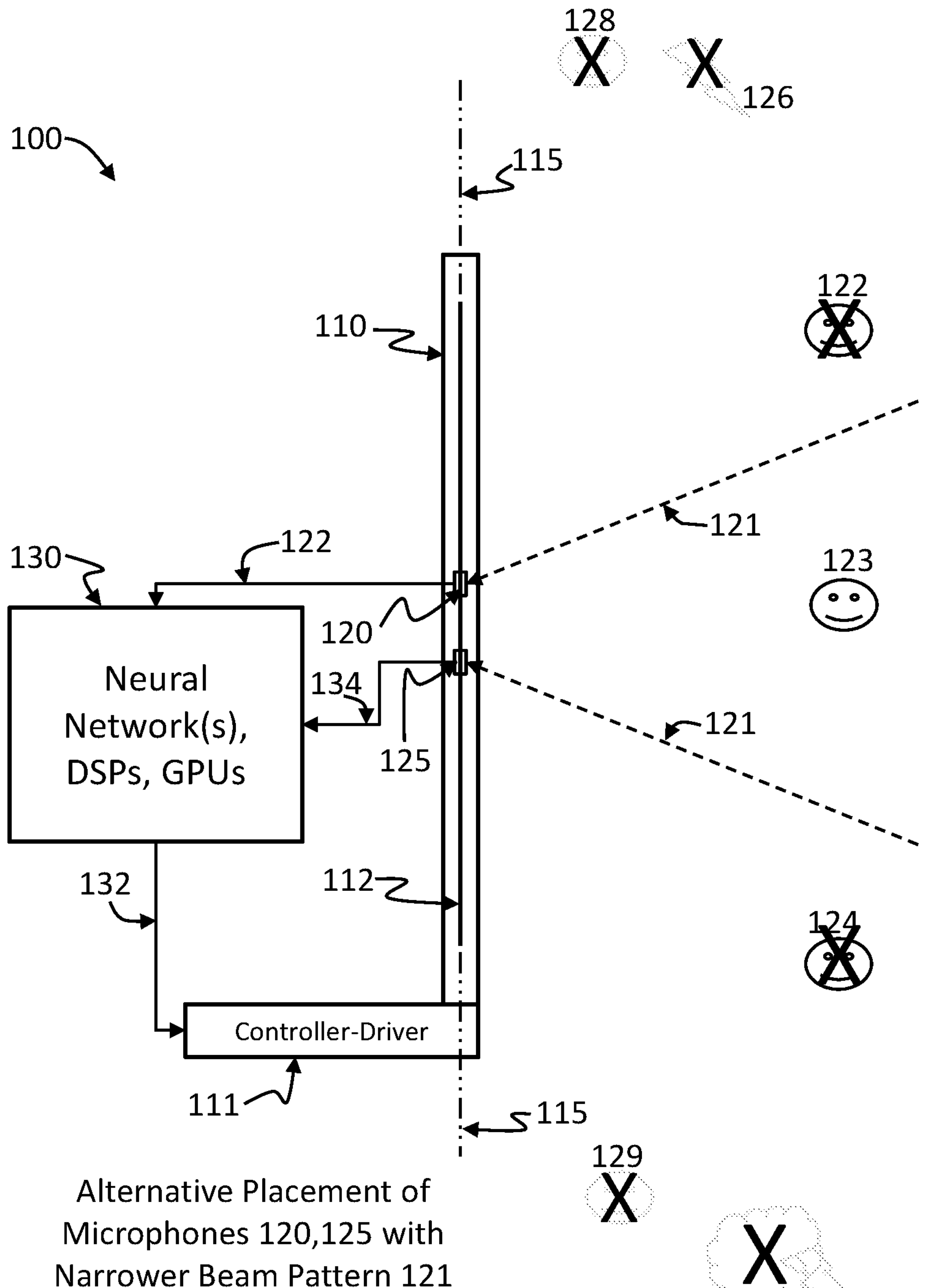
FIG. 15 shows alternative placements of microphones (120, 125) which modifies the beam pattern (121) such that beamforming is improved over traditional or classical phase-shift beamforming by the one or more neural networks (130).

FIG. 15 shows alternative placements of microphones (120, 125) which modifies the beam pattern (121) or beamwidth pattern. Here microphones (120, 125) are shown disposed in the acoustically null sound plane (115). However, microphones (120, 125) may be disposed at other locations outside of the acoustically null sound plane (115), yet still within the acoustically null sound area (117), as shown previously by microphones (119) in FIG. 6 and FIG. 11. In addition to physically relocating the microphones as shown in FIG. 15, the one or more neural networks (130) are trained to implement a reconfigurable receiving beam pattern by acquiring a narrower receiving beam pattern (121) or beamwidth pattern from acoustic phasing and/or artificial intelligent neural network beamforming from the first microphone (120) and the second microphone (125). So, the reconfigurable receiving beam pattern or beamforming pattern with variable beamwidth can be reconfigured by physically repositioning microphones (120, 125), or by leaving them in stationary positions as shown in FIG. 14 and reconfiguring or varying the beamforming with phasing or with neural network training. In this way a higher sensitivity is received from sound source (123) within the narrowed beam pattern (121) and a higher rejection is achieved for sound sources (122, 124, 126, 127, 128, 129) outside of the beam pattern (121). Here, sound sources (122, 124, 126, 127, 128, 129) are covered with an X to indicate that those sound sources are rejected, noise cancelled, and/or decreased.

Figure 16:
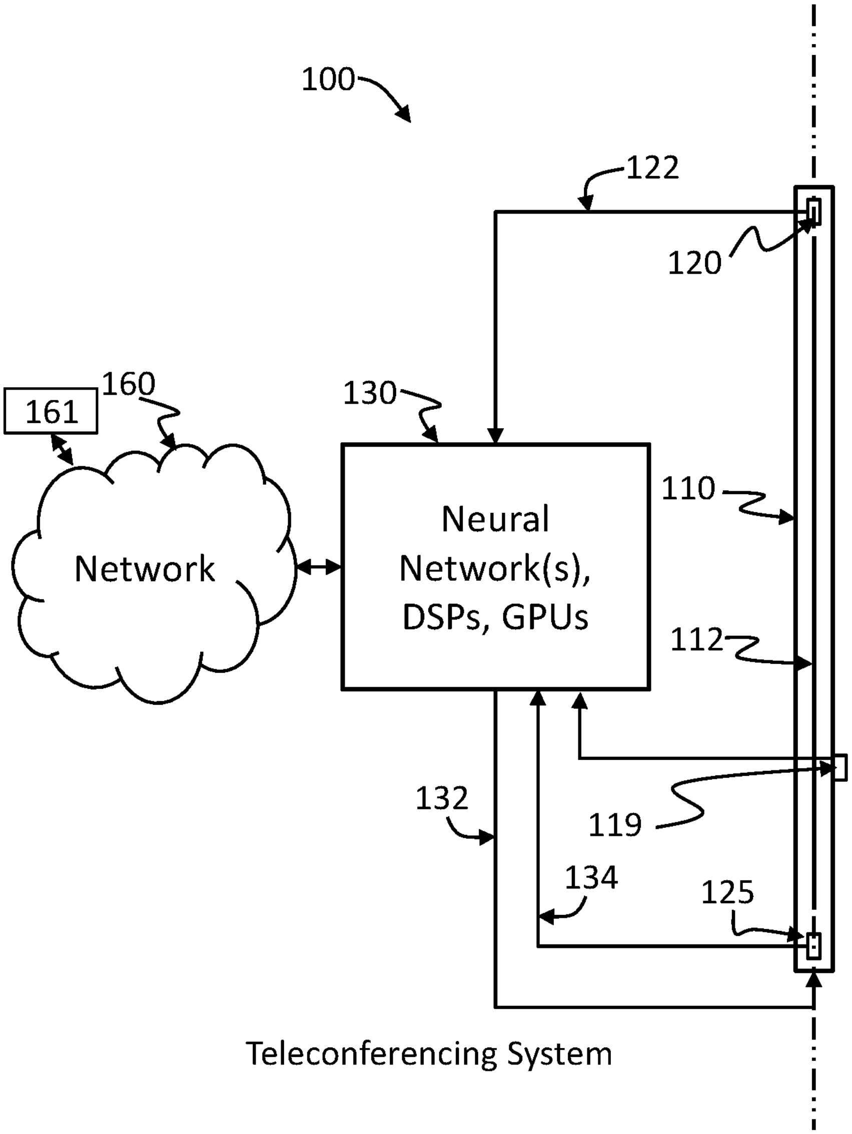
FIG. 16 shows the anti-feedback audio device (100) connected to a communications network (160) through the neural network (130) when used as a teleconferencing system.

FIG. 16 shows the anti-feedback audio device (100) connected to remote users (161) through a communications network (160) and through the neural network (130) running on DSPs and/or GPUs, or other electronic capabilities for implementing two-way communication between the anti-feedback audio device (100) and the communications network (160) for operation with other parties or technologies through communications network (160) when used as a teleconferencing system. Here communications from the user through one or more microphones (120, 125, 119) are communicated to the neural network (130) using DSPs, GPUs, or other electronics. This provides functionalities such as noise reduction including electronic and environmental noise reduction, echo cancellation, beamforming including artificial intelligence beamforming, anti-feedback, equalization, and other processing before transmitting the signal to the remote user (161) through the communications network (160). Other signals from a remote user (161) are also transmitted from their device through the communications network (160) through the neural network (130), DSPs, GPUs, or other electronics to provide functionalities such as noise reduction, echo cancellation, beamforming, anti-feedback, equalization, and other processing before transmitting the signal through the second output (132) from the one or more neural networks (130) thus communicating back through the at least one dipole speaker (110) and out to the present device user.

Figure 17A:
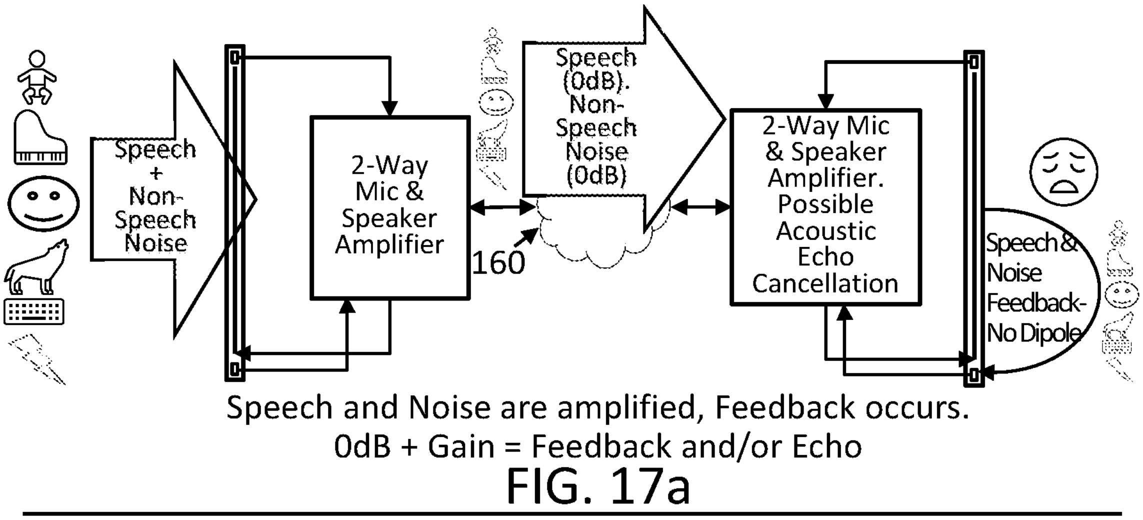
FIG. 17A shows how speech and non-speech noise are communicated through standard communications devices, transceivers, and/or teleconferencing units.

FIG. 17A shows how speech and non-speech noise are communicated through standard communications devices, transceivers, and/or teleconferencing units. Here, speech and non-speech noise enter the device on the left through the microphones as shown in previous drawings. The speech and non-speech noise travel to the right through the 2-way microphone and speaker amplifier, into the network (160). Here, the both the speech and the non-speech noise remain at a relative 0 dB through the network. Traveling further to the right, the speech and non-speech noise enter the 2-way microphone and speaker amplifier of the standard communication device, transceiver, and/or teleconferencing unit on the right. The speech and non-speech noise is amplified and emitted from the dipole speaker to the listener on the right. Since the device on the right has no dipole speaker, the acoustic wave from the dipole speaker travels back into the microphone on the right, is amplified again through the 2-way mic and speaker and travels back across the network to the device on the left. The speech and non-speech noise emit from the dipole speaker on the left, then back into the microphone and the left, and cause a feedback loop. Note that the amplification (gain) of the speech and the noise in both directions, coupled with the lack of a dipole speaker for phase cancellation at the microphones results in feedback and/or echo. Acoustic echo cancellation may be used but standard acoustic echo cancellation devices are slow, do not function consistently, and miss many of the echoes.

Figure 17B:
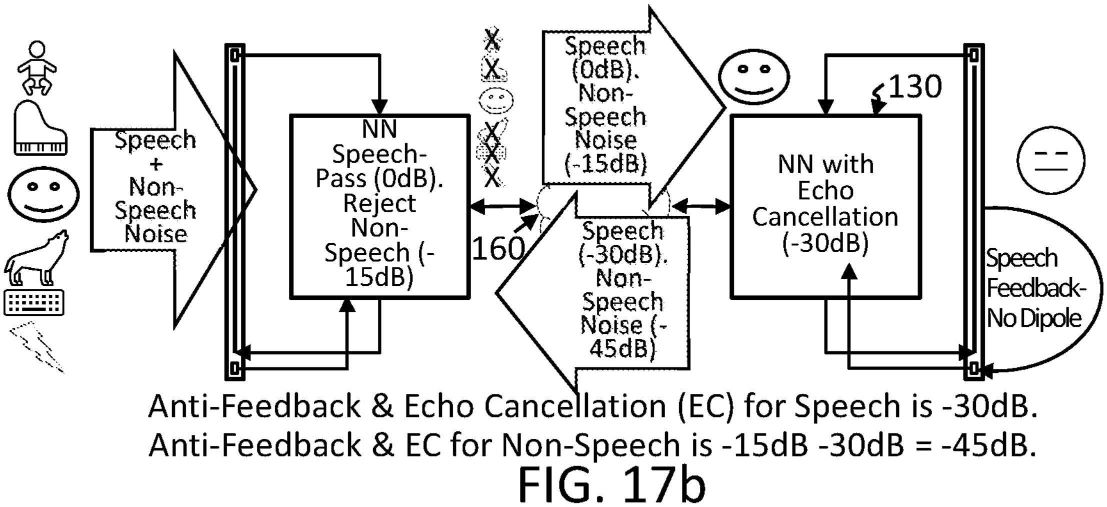
FIG. 17*b* shows how

FIG. 17*b* shows how FIG. 17*a* is improved with neural networks. Here, speech and non-speech enter the microphones of the device on the left, but in this case the speech and non-speech is processed or enhanced by enhancement techniques in the neural network that has been trained to pass speech and reject non-speech. This results in speech passing by speech traveling into the network (160) at the same relative 0 dB while non-speech rejection occurs by non-speech being rejected at approximately −15 to −18 dB by the neural network. This speech then enters the device on the right with speech at a relative 0 dB while non-speech is down at a relative −15 dB. Since there is no dipole speaker on the right in FIG. 17*b*, this speech comes out of the dipole speaker on the right and is picked up and fed back by the microphone on the right. Thus, the original speech at a relative 0 dB and the non-speech at a relative −15 dB re-enter the system from the right. The neural network (130) on the right suppresses echo cancellation by approximately −30 dB, so the anti-feedback and echo cancellation result in the signal going through the network from right to left and emerging from the device on the left with speech at −30 dB and non-speech at −45 dB. This is significant, but nowhere near as remarkable and unexpected as adding the dipole speaker with as shown in FIG. 17*c*.

Figure 17C:
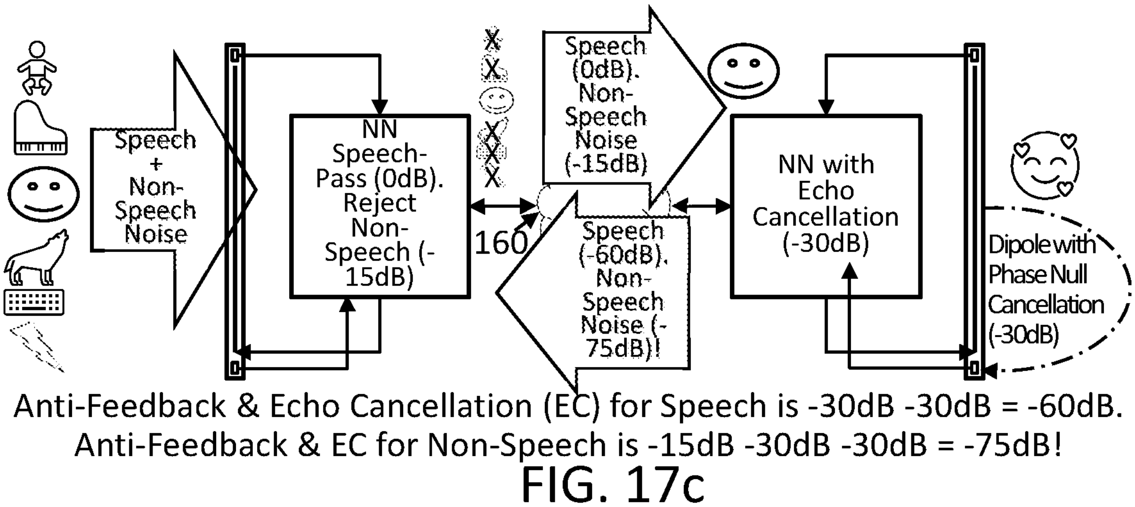
FIG. 17*c* shows how

FIG. 17*c* shows how FIG. 17*b* is improved with the dipole speaker. Here, speech and non-speech enter the microphones of the device on the left, but as in FIG. 17*b* the speech and non-speech is processed by the neural network that has been trained to pass speech and reject non-speech. This results in speech traveling into the network (160) at the same relative 0 dB while non-speech is rejected by approximately −15 to −18 dB by the neural network. This speech then enters the device on the right with speech at a relative 0 dB while non-speech is down at a relative −15 dB. Here, in FIG. 17*c*, there is a dipole speaker on device on the right. Thus speech comes out of the dipole speaker on the right at approximately 0 dB but is phase cancelled at the microphone on the right and enters the microphone on the right at a relative −30 dB. Thus, the original speech at a relative 0 dB and the non-speech at a relative −15 dB re-enter the system from the right with speech at a relative −30 dB and non-speech at a relative −45 dB. The neural network (130) on the right then suppresses the signal with echo cancellation by another approximately −30 dB, so the anti-feedback and echo cancellation result in the signal going through the network from right to left and emerging from the device on the left with speech at an incredible −60 dB and non-speech at an almost unbelievable −75 dB. This −60 dB for speech and −75 dB for non-speech is an absolutely remarkable and unexpected result. In addition, by using beamforming on the left device to eliminate non-speech sources such as babies, barking dogs, etc., and additional −6 dB can be achieved for non-speech, so that non-speech can achieve the remarkable and unexpected result of a relative −81 dB! Other patents and literature do not disclose or contemplate alone or in combination this extraordinary speech to noise level.

Figure 18:
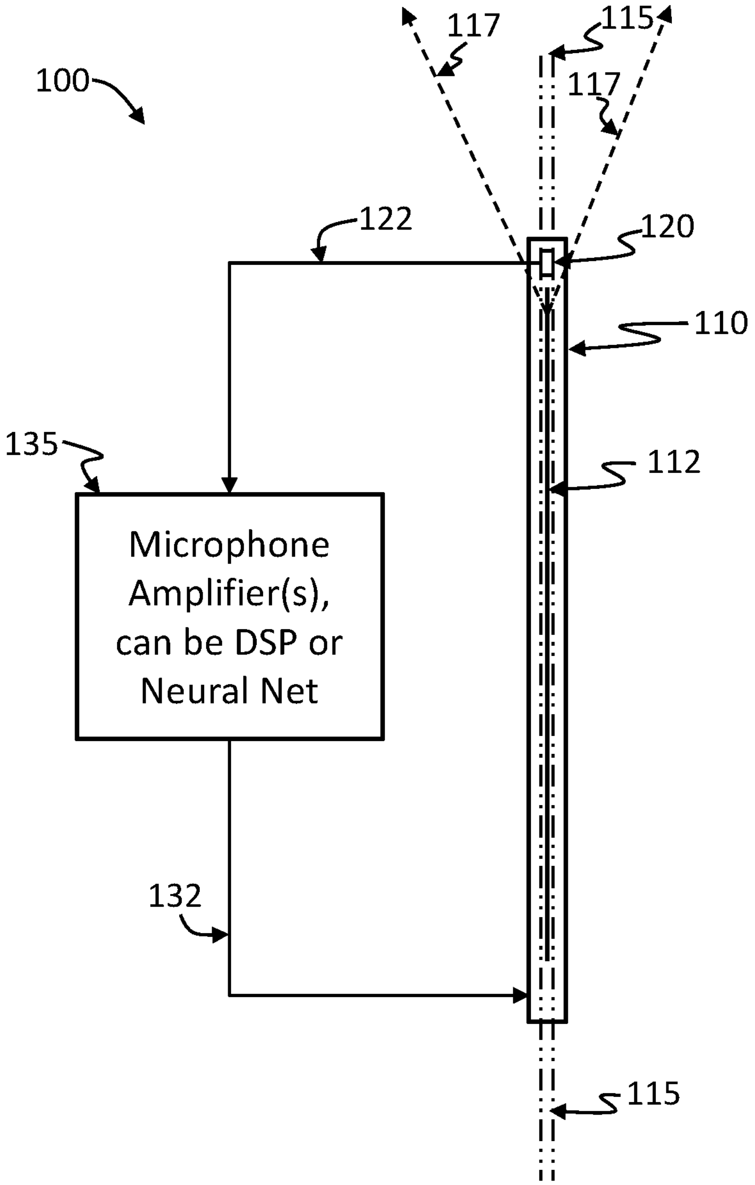
FIG. 18 shows an anti-feedback audio device with at least one dipole speaker (110) having a diaphragm (112), the diaphragm configured to form an acoustically null sound plane (115) and/or an acoustically null sound area (117); and at least one microphone (120) disposed within the acoustically null sound plane (115).

FIG. 18 shows an anti-feedback audio device with at least one dipole speaker (110) having a diaphragm (112), the diaphragm configured to form an acoustically null sound plane (115); at least one microphone (120) disposed substantially in the acoustically null sound plane (115); and one or more amplifiers (135) communicatively coupled between the at least one microphone (120) and the at least one dipole speaker (110) such that a first output (122) from the at least one microphone is communicated to the one or more amplifiers (135), and a second output (132) from the one or more amplifiers (135) is communicated to the at least one dipole speaker (110) in an anti-feedback fashion.

Figure 19:
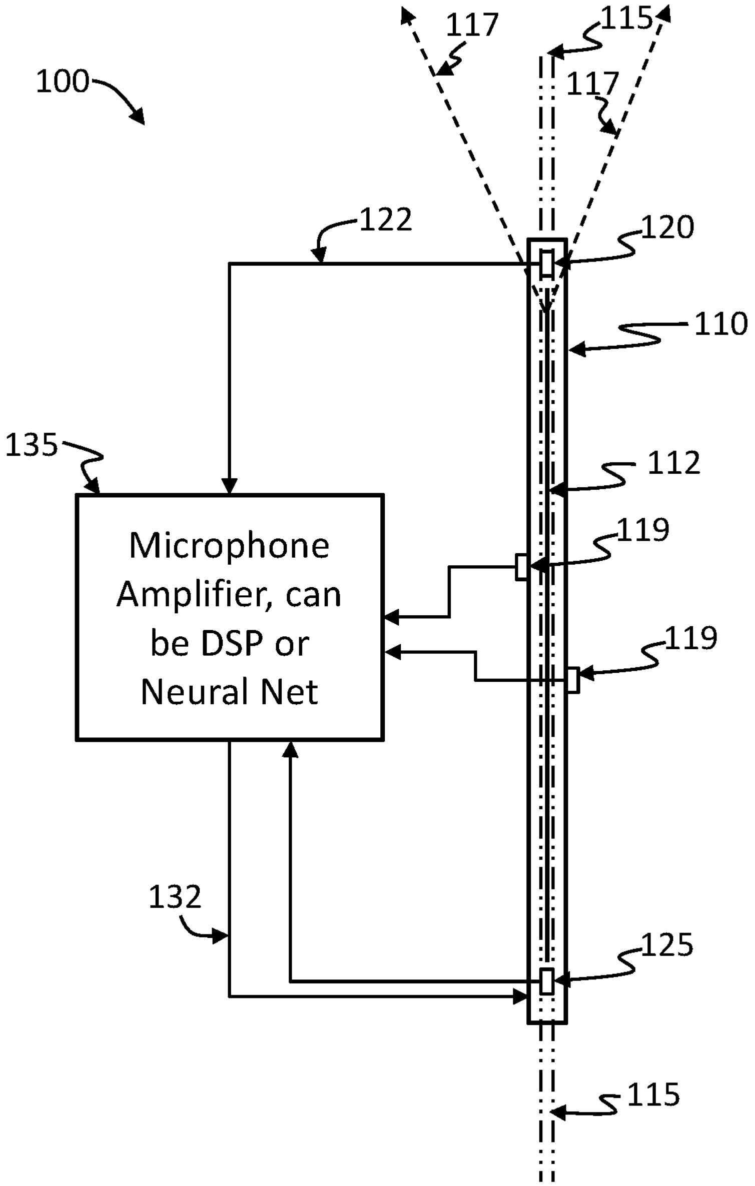
FIG. 19 shows an anti-feedback audio device with at least one dipole speaker (110) having a diaphragm (112), the diaphragm configured to form an acoustically null sound plane (115) and/or an acoustically null sound area (117); and multiple microphones (120, 119, 125) disposed substantially in the acoustically null sound plane (115) or in the acoustically null sound area (117).

FIG. 19 shows an anti-feedback audio device (100) with at least one dipole speaker (110) having a diaphragm (112), the diaphragm configured to form an acoustically null sound plane (115) and an acoustically null sound area (117); multiple microphones (120, 119, 125) disposed substantially in the acoustically null sound plane (115) or in the acoustically null sound area (117) as shown in previous figures; and one or more amplifiers (135) communicatively coupled between the multiple microphones (120, 119, 125) and the at least one dipole speaker (110) such that outputs from the multiple microphones (120, 119, 125) are communicated to the one or more amplifiers (135), and second outputs (132) from the one or more amplifiers (135) is communicated to the at least one dipole speaker (110) in an anti-feedback fashion.

Other features, aspects and objects can be obtained from a review of the figures and the claims. It is to be understood that other aspects can be developed and fall within the spirit and scope of the inventive disclosure.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

For purposes of the present description, unless specifically disclaimed, the singular includes the plural and vice versa. The words "and" and "or" shall be both conjunctive and disjunctive. The words "any" and "all" shall both mean "any and all", and the words "including," "containing," "comprising," "having," and the like shall each mean "including without limitation." Moreover, words of approximation such as "about," "almost," "substantially," "approximately," and "generally," may be used herein in the sense of "at, near, or nearly at," or "within 0-10% of," or "within acceptable manufacturing tolerances," or other logical combinations thereof. Referring to the drawings, wherein like reference numbers refer to like components.

The foregoing description of the present aspects has been provided for the purposes of illustration and description. It is not intended to be exhaustive or to limit the invention to the precise forms disclosed. Various additions, deletions and modifications are contemplated as being within its scope. The scope is, therefore, indicated by the appended claims with reference to the foregoing description. Further, all changes which may fall within the meaning and range of equivalency of the claims and elements and features thereof are to be embraced within their scope.

The invention claimed is:

1. An anti-feedback audio device comprising:

a dipole speaker having a diaphragm, the diaphragm configured to form an acoustically null sound plane and an acoustically null sound area surrounding the acoustically null sound plane;

a first microphone disposed within the acoustically null sound plane;

a second microphone disposed within the acoustically null sound area and outside of the acoustically null sound plane; and a neural network communicatively coupled to the first microphone, the second microphone, and the dipole speaker such that a first output from the first microphone and a second output from the second microphone is communicated to the neural network, and a third output from the neural network is communicated to the dipole speaker.

2. The anti-feedback audio device of claim 1 wherein a first acoustic signal from a front of the dipole speaker and an out-of-phase acoustic signal from a rear of the dipole speaker combine to result in phase cancellation in the acoustically null sound area and the acoustically null sound plane.

3. The anti-feedback audio device of claim 1 wherein the first microphone is an omnidirectional microphone.

4. The anti-feedback audio device of claim 1 wherein additional microphones are placed in additional locations on the dipole speaker within the acoustically null sound area.

5. The anti-feedback audio device of claim 1 wherein the dipole speaker is a planar speaker.

6. The anti-feedback audio device of claim 1 wherein the dipole speaker is a planar magnetic speaker.

7. The anti-feedback audio device of claim 1 wherein the dipole speaker includes a supporting structure such that the dipole speaker is configurable to stand upright from 0 [zero] degrees to at least 150 [one hundred fifty] degrees from a horizontal plane.

8. The anti-feedback audio device of claim 1 wherein the third output of the neural network is communicated through a controller-driver to the dipole speaker.

9. The anti-feedback audio device of claim 1 wherein the neural network is at least one of a deep neural network, convolutional neural network (CNN), recurrent neural network (RNN), Perceptron, Feed Forward, Radial Basis Network, Long/Short Term Memory (LSTM), Gated Recurrent Units (GRU), Auto Encoders (AE), Variational AE, Denoising AE, Sparse AE, Markov Chain, Hopfield Network, Boltzmann Machine, Restricted BM, Deep Belief Network, Deep Convolutional Network, Deconvolutional Network, Deep Convolutional Inverse Graphics Network, Generative Adversarial Network, Liquid State Machine, Extreme Learning Machine, Echo State Network, Deep Residual Network, Kohonen Network, Support Vector Machine, and Neural Turing Machine.

10. The anti-feedback audio device of claim 1 wherein the neural network executes on at least one of a digital signal processor (DSP), a graphics processing unit (GPU), or a separate semiconductor device.

11. The anti-feedback audio device of claim 1 wherein the neural network is trained to reduce at least one of sounds of noise, disturbances, dogs barking, babies crying, musical instruments, sirens, keyboard clicks, thunder, lightning, interferences, or other non-speech sounds.

12. The anti-feedback audio device of claim 1 wherein the neural network is trained to pass human speech.

13. The anti-feedback audio device of claim 1, further comprising a third microphone disposed within the acoustically null sound plane the third microphone communicatively coupled to the neural network.

14. The anti-feedback audio device of claim 13 wherein the neural network is trained to implement a reconfigurable receiving beam pattern from beamforming of the first microphone and the third microphone such that a variable beamwidth is achieved with a higher sensitivity to sound sources within the reconfigurable receiving beam pattern and a higher rejection of sound sources outside of the reconfigurable receiving beam pattern.

15. The anti-feedback audio device of claim 14, further comprising the neural network communicatively connected to a communications network.

16. The anti-feedback audio device of claim 15 wherein a signal arriving from the communications network is processed by the neural network and sent to the dipole speaker, or a signal departing from the first and third microphones is processed by the neural network and transmitted to the communications network.

17. The anti-feedback audio device of claim 16 wherein the anti-feedback audio device is a teleconferencing system.

18. The anti-feedback audio device of claim 17 wherein the neural network is trained to execute at least one enhancement technique of acoustic echo cancellation (AEC), acoustic echo suppression (AES), dynamic range compression (DRC), automatic gain control (AGC), noise suppression, noise cancellation, or equalization (EQ).

19. A method for minimizing feedback and other aural noises in an audio device comprising the steps of:
- configuring a dipole speaker having a diaphragm, to form an acoustically null sound plane and an acoustically null sound area surrounding the acoustically null sound plane;
- disposing within the acoustically null sound plane a first microphone;
- disposing within the acoustically null sound area and outside of the acoustically null sound plane a second microphone; and
- communicatively coupling a neural network between the first microphone, the second microphone, and the dipole speaker such that a first output from the first microphone and a second output from the second microphone is communicated to the neural network, and a third output from the neural network is communicated to the dipole speaker.

20. The method of claim 19 wherein-a first acoustic signal from a front of the dipole speaker and an out-of-phase acoustic signal from a rear of the dipole speaker combine to result in phase cancellation in the acoustically null sound area and the acoustically null sound plane.

21. The method of claim 19 wherein the first microphone is an omnidirectional microphone.

22. The method of claim 19 wherein additional microphones are placed in additional locations within the acoustically null sound area.

23. The method of claim 19 wherein the dipole speaker is a planar speaker.

24. The method of claim 19 wherein the dipole speaker is a planar magnetic speaker.

25. The method of claim 19 wherein the dipole speaker includes a supporting structure such that the dipole speaker is configurable to stand upright from 0 degrees to at least 150 degrees from a horizontal plane.

26. The method of claim 19 wherein the third output of the neural network is communicated through a controller-driver to the dipole speaker.

27. The method of claim 19 wherein the neural network is at least one of a deep neural network, convolutional neural network (CNN), recurrent neural network (RNN), Perceptron, Feed Forward, Radial Basis Network, Long/Short Term Memory (LSTM), Gated Recurrent Units (GRU), Auto Encoders (AE), Variational AE, Denoising AE, Sparse AE, Markov Chain, Hopfield Network, Boltzmann Machine, Restricted BM, Deep Belief Network, Deep Convolutional Network, Deconvolutional Network, Deep Convolutional Inverse Graphics Network, Generative Adversarial Network, Liquid State Machine, Extreme Learning Machine, Echo State Network, Deep Residual Network, Kohonen Network, Support Vector Machine, or Neural Turing Machine.

28. The method of claim 19 wherein the neural network executes on at least one of a digital signal processor (DSP), a graphics processing unit, or a separate semiconductor device.

29. The method of claim 19 wherein the neural network is trained to reduce at least one of sounds of noise, disturbances, dogs barking, babies crying, musical instruments, sirens, keyboard clicks, thunder, lightning, interferences, or other non-speech sounds.

30. The method of claim 19 wherein the neural network is trained to pass human speech.

31. The method of claim 19, further comprising a third microphone disposed within the acoustically null sound plane the third microphone communicatively coupled to the neural network.

32. The method of claim 31 wherein the neural network is trained to implement a reconfigurable receiving beam pattern from beamforming of the first microphone and the third microphone such that a variable beamwidth is achieved with a higher sensitivity to sound sources within the beam pattern and a higher rejection of sound sources outside of the beam pattern.

33. The method of claim 32, further comprising the neural network communicatively connected to a communications network.

34. The method of claim 33 wherein a signal arriving from the communications network is processed by the neural network and sent to the dipole speaker, or a signal departing from the first and third microphones is processed by the neural network and transmitted to the communications network.

35. The method of claim 34 wherein the audio device is a teleconferencing system.

36. The method of claim 35 wherein the neural network is trained to execute at least one enhancement technique of acoustic echo cancellation (AEC), acoustic echo suppression (AES), dynamic range compression (DRC), automatic gain control (AGC), noise suppression, noise cancellation, or equalization (EQ).

* * * * *